(12) United States Patent
Menon et al.

(10) Patent No.: US 12,189,628 B2
(45) Date of Patent: Jan. 7, 2025

(54) SCAN PARSING

(71) Applicant: Databricks, Inc., San Francisco, CA (US)

(72) Inventors: Prashanth Menon, Jersey City, NJ (US); Alexander Behm, Lafayette, CA (US); Sriram Krishnamurthy, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 145 days.

(21) Appl. No.: 18/162,366

(22) Filed: Jan. 31, 2023

(65) Prior Publication Data

US 2024/0061840 A1 Feb. 22, 2024

Related U.S. Application Data

(63) Continuation of application No. 17/892,376, filed on Aug. 22, 2022, now Pat. No. 12,072,880.

(51) Int. Cl.
*G06F 16/00* (2019.01)
*G06F 16/2453* (2019.01)
*G06F 16/28* (2019.01)

(52) U.S. Cl.
CPC ...... *G06F 16/24542* (2019.01); *G06F 16/285* (2019.01)

(58) Field of Classification Search
None
See application file for complete search history.

(56) References Cited

U.S. PATENT DOCUMENTS

2008/0177994 A1 7/2008 Mayer
2017/0262633 A1 9/2017 Miserendino et al.

OTHER PUBLICATIONS

United States Office Action, U.S. Appl. No. 17/892,376, filed Oct. 5, 2023, 12 pages.

*Primary Examiner* — Tuankhanh D Phan
(74) *Attorney, Agent, or Firm* — Fenwick & West LLP

(57) ABSTRACT

The present application discloses a method, system, and computer system for parsing files. The method includes receiving an indication that a first file is to be processed, determining to begin processing the first file using a first processing engine based at least in part on one or more predefined heuristics, indicating to process the first file using a first processing engine, determining whether a particular error in processing the first file using the first processing engine has been detected, in response to determining that the particular error has been detected, indicate to stop processing the first file using the first processing engine and indicate to continue processing using a second processing engine, and storing in memory information obtained based on processing the first file by one or more of the first processing engine and the second processing engine.

20 Claims, 11 Drawing Sheets

SCAN PARSING

CROSS REFERENCE TO RELATED APPLICATIONS

This application is a continuation of U.S. application Ser. No. 17/892,376, filed Aug. 22, 2022, which is incorporated by reference in its entirety.

BACKGROUND OF THE INVENTION

A system for executing a query comprises an engine for ingesting information to determine a set of a plan for ingesting the information, allocating compute resources to process a file in which the information is comprised, and parsing the file to obtain the information. A processing engine is used to parse the file and obtain information. However, in some cases this is a problem as the processing engine processes certain commands in a suboptimal manner.

BRIEF DESCRIPTION OF THE DRAWINGS

Various embodiments of the invention are disclosed in the following detailed description and the accompanying drawings.

DETAILED DESCRIPTION

Figure 1:
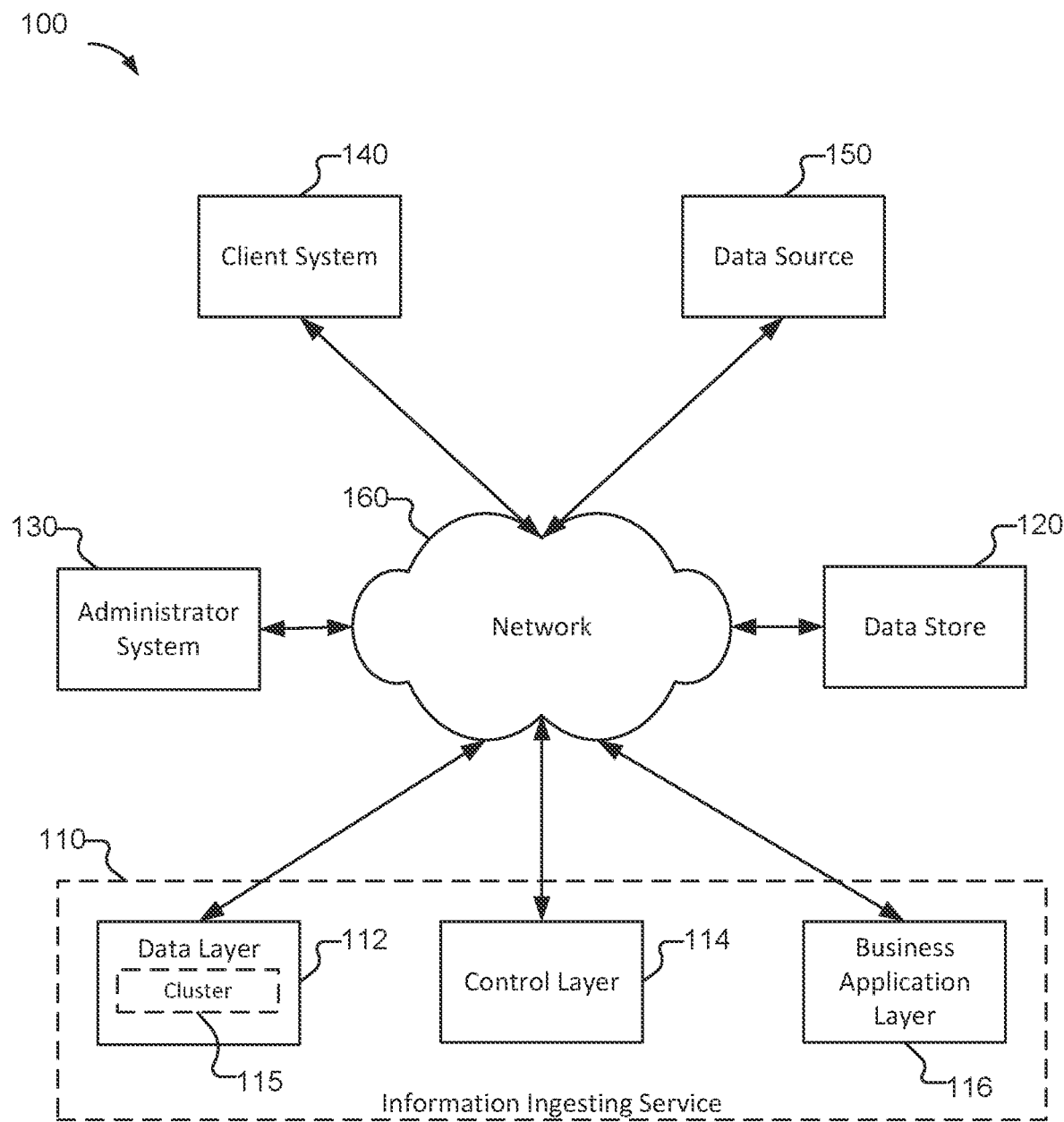
FIG. 1 is a block a diagram of a system for ingesting information in a file according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a data entity may include a table, a view, a column (e.g., of a table), a model (e.g., a machine learning model), a notebook, a job, or the like. A data entity may be various other data objects.

As used herein, a file chunk (also sometimes referred to herein as a chunk) may include a smaller file that is obtained based on a segmentation of a larger file (e.g., an aggregated file) and/or a segment or part of the larger file. A larger file can be segmented into a plurality of file chunks. In some embodiments, the larger file is segmented based at least in part on a chunking policy. The chunking policy can define one or more characteristics for file chunks segmented from the larger file.

As used herein, a compute resource may refer to a virtual machine, a computing environment, a container, etc. As an example, a compute resource can be instantiated on a node of a cluster.

As used herein, a processing engine may include a method, service, or module for processing a file/file chunk. The processing engine is implemented by (e.g., executed on) a compute resource.

Related art data systems ingest files to obtain one or more data entities. For example, related art systems parse the files to extract information that is then stored according to a predefined format or protocol. For example, related art systems read obtained files and determines one or more tables based on information parsed from the obtained files. Related art systems can implement a unified analytics engine for large-scale data processing such as Apache Spark™. The analytics engine can read files according to various formats, such as JavaScript Object Notation (JSON).

Related art systems can read JSON files using a Java virtual machine (JVM). JVMs support a large number of features that can be used to parse files. However, reading/parsing a JSON file using a JVM has a relatively large associated cost. Parsing JSON files using a JVM is inefficient due to the wider breadth of features it must support, but also because of unavoidable overheads incurred in the JVM itself. Although the support for a large number of features enables JVMs to parse a large variety of files (e.g., files including various formatting, etc.), JVMs are not optimized to process certain other JSON files.

Various embodiments implement a processing engine that is optimized for processing certain files (e.g., certain JSON files). Because the processing engine is optimized for processing certain files, the processing engine is able to more quickly parse information from such types of files than a traditional JVM. Accordingly, implementing the processing engine enables the system to more quickly ingest information from data sources and more quickly make the information available, such as via a table or other data entity.

According to various embodiments, a system uses a processing engine to process a file or file chunk. In response to determining that an error occurs during processing of the file/file chunk, the system determines whether to fall back to a different processing engine to continue processing the file/file chunk (e.g., process a problematic part of the file/file chunk, complete processing a remainder of the file/file chunk, etc.). The system can determine to fall back to a different processing engine to continue processing the file/file chunk based on detection of an error and/or a type of error detected. As an example, the system determines to fall back to a different processing engine in response to determining that an error occurred during processing of the file/file chunk using the current processing engine. In response to determining to fall back to a different processing engine, the system determines the processing engine to which processing of the file/file chunk is to fall back and causes such a processing engine to continue processing of the file/file chunk (e.g., from a part/location of the file/file chunk at which the previous processing engine had last successfully processed/parsed).

Various embodiments include a system, device, or method for processing a file or a file chunk such as parsing the file/file chunk in connection with ingesting information comprised in the file/file chunk. The method includes receiving an indication that a first file is to be processed, determining to begin processing the first file using a first processing engine based at least in part on one or more predefined heuristics, indicating to process the first file using a first processing engine, determining whether a particular error in processing the first file using the first processing engine has been detected, in response to determining that the particular error has been detected, indicating to stop processing the first file using the first processing engine and indicating to continue processing using a second processing engine, and storing in memory information obtained based on processing the first file by one or more of the first processing engine and the second processing engine.

The system receives an indication that a file is to be processed. The system can determine that the file is to be processed based on a request to process (e.g., ingest) the file or based on the system receiving the file. For example, the system obtains new files from a data source and the system determines to process the new files such as to store information comprised in the new files into one or more datasets, such as in the form of a table or other data entity. In some embodiments, the file corresponds to data obtained via a streaming interface. The system obtains a batch of data (e.g., having a specified amount/size of data) as a file, loads the batch of data into the memory space, and processes the batch data (e.g., decompress/decrypt) while maintaining a pointer running the memory space after data has been processed.

Processing relatively large files can be inefficient. For example, processing large files can cause undesirable latency because only a single compute resource can process the file at any given time. According to various embodiments, the system determines whether to process an obtained larger file or whether to segment (e.g., chunk) the file into smaller files (also referred to herein as file chunks). The system can determine whether to segment/chunk the file into a set of file chunks based at least in part on a predefined chunking policy. The chunking policy can define a maximum file size and/or a minimum chunk size according to which the file is to be chunked. As an example, the maximum file size can be 50 MB. In some embodiments, the chunking policy defines a desired (e.g., optimized) number of file chunks into which a file is to be segmented, such as based on a set of compute resources that can be allocated to process the corresponding set of file chunks in parallel. As an example, if the system comprises 16 (or N) compute resources that can be allocated to process the file and if the size of the initial file is 512 MB (or M), then the system determines to chunk the initial file into 16 (or N) separate file chunks that are 512/16 MB or 32 MB (or M/N) to be respectively assigned to the 16 (or N) allocated compute resources. In some embodiments, the chunking policy defines a maximum number of rows of information.

According to various embodiments, the system can determine (or be preset with) an optimal size of file chunks or an optimal range of sizes for file chunks. For example, the system can use a mechanism to fall back to alternative/fallback processing engines in the event that a particular processing engine succumbs to an error such as a parsing error. If the particular processing engine is relatively more optimized to process the particular file chunk than an alternative/fallback processing engine, if the system were to fall back to the alternative processing engine, the remainder of the file chunk would be processed less efficiently or effectively. Accordingly, the system can determine an optimal size/size range of file chunks based on (i) optimizing an amount/percentage of a file chunk being processed by the preferred processing engine (e.g., the processing engine is optimized to process the particular type of file chunk or file format), and/or (ii) minimizing the amount/percentage of a file chunk being processed by a non-preferred processing engine (e.g., a fallback processing engine).

In some embodiments, the system determines to segment a file to be processed into a set of file chunks. As the system is processing at least a subset of the file chunks, the system can determine to increase (e.g., extend) the size of the current file chunk(s) being processed if the system observes that the file is being processed by the preferred processing engine without succumbing to an error (e.g., a particular error such as a parsing error). For example, the system dynamically determines a size of a file chunk to be processed. The dynamic determination of the size of the file chunk avoids creating too many chunks, which can lead to too many tasks and too much overhead.

In response to determining that a file/file chunk is to be processed, the system determines a particular processing engine to start processing the file/file chunk (also referred to herein as the first processing engine or a preferred processing engine). The system can determine the particular processing engine to use to process the file/file chunk based at least in part on one or more predefined heuristics. The one or more predefined heuristics can be set based on a selection policy defined by an administrator or determined by the system based on historical information pertaining to processing other files/file chunks, such as files/file chunks having a similar format, etc. The first processing engine can be determined, from among a set of processing engines, based on a determination of the processing engine that is optimized for (or deemed best at) processing the file/file chunk. As an example, the system can query a mapping of types of files (or formats for files) to optimized processing engines for those types of files (or formats for files), or a mapping of types of files to a predefined order in which processing engines are to be selected to process the file/file chunk. In response to determining the first processing engine, the system can cause the first processing engine to process the file/file chunk.

A processing engine is generally configured to handle many various different error conditions. Examples of error conditions include structural errors (e.g., a missing comma, a bracket, a quotation mark, etc.), an invalid JSON (e.g., single quotes, leading zeroes, etc.), and corrupted files. The error conditions can arise during processing of the file. For example, the error conditions can correspond to parsing errors (e.g., missing quotations, incorrect numbers (e.g., 1.23.4.34), invalid floating point numbers (e.g., NaN, Inf, −Infinity)).

According to various embodiments, the system falls back to processing the file/file chunk in response to detection of certain errors, such as a parsing error. For non-parsing errors, the system can continue to use the current processing engine (e.g., restarting the processing of the file/file chunk using the current processing engine). During processing of a file/file chunk, the system can monitor processing of the file/file chunk, detect processing errors (e.g., parsing errors and/or non-processing errors), and logging the processing errors. For example, the system can store an indication of processing errors into an error log. In some embodiments, the system determines and/or stores an error code in connection with logging an error. The system can associate the error code with an indication that an error occurred. As an example, the system can use the error code in connection with determining a type of processing error. As another example, the system uses these error codes to more granularly classify errors such as using error codes to distinguish different types of parsing errors. The error can be logged by the current processing engine, by a service that manages processing a file, by one or more compute resources, etc.

In connection with logging an error, the system can log a last spot at which processing of the file/file chunk was successfully processed. In some embodiments, the system (e.g., the current processing engine) monitors a last part of the file/file chunk that was successfully processed. As an example, the system can log a part of the file/file chunk at which an error occurred.

In response to determining that an error occurred, the system can determine whether the error corresponds to a parsing error. For example, the system performs a lookup in the error log to obtain an error code associated with the error. The system can use the error code in connection with determining whether the error is a parsing error. The system can further use the error code in connection with determining a particular type of parsing error that occurred.

In some embodiments, the system determines to invoke a fallback processing engine (e.g., an alternative processing engine from a set of processing engines) in response to determining that a parsing error occurred. For example, based on the type of error or error code associated with the error, the system determines whether the current processing engine is optimized (or equipped) to handle the particular error. In response to determining that the current processing engine is optimized (or equipped) to handle the particular error, the system can determine to use the current processing engine to resume/continue processing the file/file chunk and/or to cause the current processing engine to continue such processing. Conversely, in response to determining that the current processing engine is not optimized (or equipped) to handle the particular error, the system can determine to invoke a fallback processing engine with which processing of the file/file chunk is to be continued. The system can further cause the fallback processing engine to continue processing the file/file chunk.

In response to detecting that an error occurred (e.g., a parsing error) and determining to invoke a fallback processing engine, the system determines the fallback processing engine to which processing of the file/file chunk is to fall back. For example, the fallback processing engine can be selected from a set of one or more fallback processing engines. As another example, the system has a single fallback processing engine to which processing can fall back. In the case of the system comprising a plurality of fallback processing engines, the system selects a particular fallback processing engine from among the plurality of fallback processing engines.

In some embodiments, the system selects the particular fallback processing engine to which to fall back based on a type of error that occurred. For example, the particular fallback processing engine is selected based on a capability or characteristics of the processing engine. As another example, the system determines the type of parsing error and determines a particular fallback processing engine among the plurality of processing engines that is optimized for handling the error or the type of file (e.g., file format, syntax, etc.). As another example, the processing engine optimized for handling the error or the type of file corresponds to a processing engine for which an expected likelihood is the highest to successfully complete processing the file/file chunk among the plurality of processing engines. As another example, the processing engine optimized for handling the error or the type of file can correspond to a preset definition of processing engines to handle certain errors or types of files. The particular fallback processing engine to which processing of the file/file chunk is to fall back can be selected based on a determination that the particular processing engine is not expected to encounter, trigger, be susceptible to, or succumb to the same error. As an example, the particular processing engine is selected based on a determination that the particular processing engine is not expected to encounter, trigger, be susceptible to, or succumb to the same error or another parsing error.

In some embodiments, the system selects the particular fallback processing engine to fall back on based at least in part on a predefined order of processing engines. The system can store a single predefined order of processing engines or a plurality of predefined orders of processing engines. For example, the system can store a plurality of predefined orders of processing engine for a plurality of different types of files (e.g., various file formats, syntax, etc.). In response to determining that processing of the file/file chunk is to fall back to another processing engine, the system obtains the applicable predefined order of processing engines and determines the particular fallback processing engine according to the predefined order. For example, the system determines the particular fallback processing engine to be a next processing engine in the predefined order. In some embodiments, the order of fallback processing engines is balances processing speed and failure susceptibility so that earlier processing engines in the order are faster in terms of processing speed but more likely to suffer errors coming up during processing, and later processing engines in the order are slower in terms of processing speed but less likely to suffer errors coming up during processing.

In some embodiments, the system selects the particular fallback processing engine to which to fall back based at least in part on (i) a predefined order of processing engines, and (ii) a type of error that occurred. In response to determining that processing of the file/file chunk is to fall back to a fallback processing engine, the system obtains the applicable predefined order and determines the fallback engine to which processing is to fall back to based on a first processing engine that is not expected to succumb to the same error (e.g., the particular type of parsing error that occurred). For example, in response to obtaining the predefined order, the system determines a next processing engine in the predefined order and determines whether the next processing engine is expected to succumb to the same error when processing the file/file chunk. In response to determining that the next processing engine is expected to succumb to the same error, the system determines to skip the next processing engine. In connection with skipping the next processing engine, the system determines a subsequent processing engine and then in turn determines whether such subsequent processing engine is expected to succumb to the same error. The system can sequentially determine next processing engines according to the predefined order until the system identifies a processing engine that is not expected to succumb to the same problem.

According to various embodiments, processing engines store information parsed from the file/file chunk in a memory space allocated to the processing engine or the corresponding compute resource. As an example, each processing engine has a different memory space to which information obtained during parsing a file/file chunk is to be stored. As another example, a memory space is allocated for a particular file/file chunk such that a processing engine processing a file/file chunk and a fallback processing engine to which processing of the file/file chunk falls back store information parsed from the file/file chunk in a same memory space. For example, each processing engine invoked in connection with processing a file/file chunk (e.g., an initial processing engine and one or more fallback processing engines) store information parsed from the file/file chunk in the same memory space. The processing engines invoked in connection with processing a file/file chunk can store information parsed from the file/file chunk at adjacent parts of the same memory space.

In some embodiments, the system logs a location at which information parsed from a file/file chunk was last stored in the allocated memory space when the error occurred. The system can continue writing information parsed from the file/file chunk to the memory space from the location at which the information was last successfully stored (e.g., the logged location).

According to various embodiments, the system implements parallel processing to process a file/file chunk. For example, in response to determining that a file is to be processed, the system allocates a set of compute resources for processing the file/file chunk. The set of compute resources allocated for processing the file/file chunk can be determined based at least in part on one or more characteristics of the file, such as size, file type, syntax, format, etc. In some embodiments, the system determines to implement parallel processing in response to a determination that such processing is more efficient than serial processing or using a single compute resource to process the large file. For example, the system determines to implement parallel processing in response to determining that an expected cost savings for parallel processing exceeds a predefined cost savings threshold. In response to determining to implement the parallel processing to process the file/file chunk, the system allocates the set of compute resources to process at least a subset of the set of file chunks for a file. For example, the system determines the set of file chunks based on the number of compute resources that can be allocated to processing the file. As another example, the system determines the set of file chunks based on one or more characteristics of the file and determines a compute resource (from the set of compute resources allocated to process the file) to allocate for processing each particular file chunk. A particular compute resource can be allocated to processing a plurality of file chunks (e.g., the compute resource serially processes those plurality of file chunks allocated to the compute resource).

In some embodiments, each compute resource in the set of compute resources can implement a set of processing engines. The method of falling back to a fallback processing engine in the event of an error in processing a file/file chunk can be implemented by a particular compute resource. For example, a particular compute resource that succumbs to a parsing error can continue processing the file chunk with a different processing engine (e.g., the fallback processing engine), and another compute resource that is processing another file chunk can continue to use the preferred processing engine until a parsing error occurs.

According to various embodiments, the system combines the results obtained from each processing engine during the processing of the file chunk to obtain an aggregated file chunk processing result (e.g., a data entity such as a table for the file chunk). For example, in the case that the system parses the file chunks to obtain a table and a parsing error occurred during processing a file chunk, a first processing engine can obtain results for a subset of rows of the table and one or more fallback processing engines can respectively obtain results for corresponding subset(s) of rows of the table. In response to determining that processing the file chunk has completed, the system obtains the results from the first processing engine and any fallback processing engines used to process the file chunk (e.g., obtains locations in a memory space(s) at which the results are stored) and combines the results to obtain the aggregated file chunk processing result for the file chunk.

According to various embodiments, if a file is chunked and a corresponding set of file chunks are processed by the system, the system obtains the respective aggregated file chunk processing results corresponding to the file chunks (or a location of such results, etc.) and combines the respective aggregated file chunk processing results to obtain an aggregated file processing result. The system can store the aggregated file processing result in a dataset. For example, the aggregated file processing result can be a data entity such as a table.

If the system falls back to processing a file/file chunk using a fallback processing engine in response to detection of an error such as a parsing error, processing the remainder of the file/file chunk (e.g., from a location at which the file/file chunk was last successfully processed) may be suboptimal. For example, the fallback processing engine may be less optimized to process the particular type of file, etc. than the processing engine that was previously processing such file/file chunk. Accordingly, it may be beneficial to return to processing the file/file chunk using the processing engine that was processing the file/file chunk before the error occurred. For example, the system can determine an expected problematic part of the file/file chunk (e.g., a range of locations of the file/file chunk) and the system can monitor to determine when the fallback processing engine(s) have successfully processed such problematic parts of the file/file chunk. The system may determine the expected problematic part of the file/file chunk based on an error code for the error (e.g., a particular type of parsing error). For example, after determining the type of parsing error the system can analyze the file/file chunk to determine a part(s) of the file/file chunk for which the processing engine may continue to succumb to parsing errors. The system may determine the part(s) of the file/file chunk for which the processing engine may continue to succumb to parsing errors based on a determination of part(s) of the file/file chunk that are similar to the part of the file/file chunk where the error arose. In some embodiments, in response to determining that the expected problematic part of the file/file chunk is complete by the fallback processing engine(s), the system determines to revert back to processing engine that was processing the file/chunk before the error occurred and to continue processing the file/file chunk using such processing engine until completed or occurrence of another parsing error. In some embodiments, the system determines to revert back to processing engine that was processing the file/chunk before the error occurred in response to a determination that such reversion is expected to be more efficient than completing processing of the file/file chunk using the fallback engine(s).

FIG. 1 is a block a diagram of a system for ingesting information in a file according to various embodiments of the present application. According to various embodiments, system 100 implements at least part of process 300, process 400 of FIG. 4, process 500 of FIG. 5, process 600 of FIG. 6, process 700 of FIG. 7, process 800 of Figure, process 900 of FIG. 9, process 1000 of FIG. 10, and/or process 1100 of FIG. 11.

In the example illustrated in FIG. 1, system 100 includes information ingesting service 110, data store 120, administrator system 130, client system 140, and/or data source 150. In some embodiments, information ingesting service 110 and/or data source 150 are integrated (e.g., combined into a layer or a single set of server(s)). System 100 further includes one or more networks such as network 160 over which administrator system 130 and/or client system 140 communicates with information ingesting service 110, data store 120, and/or data source 150. In various embodiments, network 160 includes one or more of a wired network, and/or a wireless network such as a cellular network, a wireless local area network (WLAN), or any other appropriate network. System 100 may include various other systems or devices.

In some embodiments, information ingesting service 110 comprises data layer 112, control layer 114, and business application layer 116. Data layer 112, control layer 114, and/or business application layer 116 can be respectively implemented by one or more servers. In some implementations, data layer 112, control layer 114, and/or business application layer 116 by a same set of one or more servers. In some embodiments, system 100 comprises a plurality of data layers that respectively process data pertaining to various tenants or customers. For example, each data layer can be implemented for a different tenant or customer.

According to various embodiments, information ingesting service 110 manages data with respect to one or more datasets. Information ingesting service 110 can receive requests to store or obtain data for one or more datasets from client system 140 and/or data source 150. Client system 140 and/or data source 150 can be connected to information ingesting service 110 via a connector, such as an application programming interface (API). In some embodiments, information ingesting service 110 provides data (or access to data such as via a link) in response to data requests. For example, the data requests can be communicated to information ingesting service 110 by client system 140. In some embodiments, information ingesting service 110 receives a data request from a data requesting service, such as a third-party service. Examples of the data requesting service include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other data consuming clients. In some embodiments, information ingesting service 110 comprises (e.g., implements) such data requesting services.

According to various embodiments, information ingesting service 110 manages (e.g., determines, stores, etc.) processing of files obtained from data source 150 or otherwise input to system 100 and storing results of such processing in the one or more datasets stored in data store 120. Information ingesting service 110 can expose data for consumption by services or other systems such as client system 140 or a service running on control layer 114 or business application layer 116. For example, the data entity (e.g., table) obtained based on processing the file/file chunk is exposed to the client system 140 or other service via an API.

According to various embodiments, information ingesting service 110 (e.g., control layer 114) obtains an indication that a file is to be processed, such as from client system 140 or another data requesting (or consumption) service. In response to obtaining the indication that the file is to be processed, information ingesting service 110 can obtain one or more characteristics associated with the file such as file size, file type, formatting, etc. Information ingesting service 110 (e.g., data layer 112 or control layer 114) determines whether to process the file as a whole or whether to segment the file into a set of file chunks for processing. Information ingesting service 110 determines whether to segment/chunk the file into a set of file chunks based at least in part on a predefined chunking policy and/or one or more characteristics associated with the file. The chunking policy is predefined, such as by administrator system 130, and defines a maximum file size, a minimum chunk size according to which the file is to be chunked, a maximum number of file chunks to be obtained from the file, and/or a minimum number of file chunks to be obtained from the file. In some embodiments, the chunking policy defines a desired (e.g., optimized) number of file chunks into which a file is to be processed, such as based on a set of compute resources that can be allocated to process the corresponding set of file chunks in parallel. In some embodiments, information ingesting service 110 dynamically determines a file chunk size or a number of file chunks to be obtained based on one or more of historical information pertaining to processing previous similar samples, a current progress of processing a current file chunk (e.g., an indication of whether a parsing error has occurred during processing of the current file chunk), etc.

In some embodiments, information ingesting service 110 uses data layer 112 to process the file/file chunk. Data layer 112 receives an indication to obtain a particular file/file chunk, such as a file received from data source 150, and to store information resulting from a processing (e.g., parsing or extracting) of the file/file chunk. In some embodiments, data layer 112 includes one or more clusters of compute resources such as virtual machines (e.g., cluster 115). As an example, cluster 115 includes one or more compute resources such as worker(s) (e.g., worker nodes, etc.). Cluster 115 can use worker(s) to process various jobs in connection with providing a service, such as processing files/file chunks and storing resulting information as a data entity in one or more datasets.

In response to determining that a file/file chunk is to be processed, information ingesting service 110 (e.g., data layer 112) determines a particular processing engine to start processing the file/file chunk. In response to determining to process a file/file chunk, control layer 114 can provide to data layer 112 an indication that the file/file chunk is to be processed. In some embodiments, information ingesting service 110 (e.g., data layer 112) determines the particular processing engine to use to process the file/file chunk based at least in part on one or more predefined heuristics. The one or more heuristics can be set based on a selection policy defined by an administrator via administrator system 130 or determined by information ingesting service 110 (e.g., data layer 112) based on historical information pertaining to processing other files/file chunks, such as files/file chunks having a similar format, etc. In various embodiments, a selection policy for an engine comprises: beginning processing using the engine that has historically had the most success in processing previous chunks of the file; ordering the engines according to parsing speed for a given file and proceed in that order; using an exploration strategy (e.g., similar to multi-armed bandit) where at times an engine is randomly selected for processing to find potentially better orderings, or any other appropriate selection policy. In some embodiments, data layer 112 determines the first processing engine, from among a set of processing engines, based on a determination of the processing engine that is optimized for (or deemed best at) processing the file/file chunk. As an example, data layer 112 queries a mapping of types of files (or formats for files) to optimized processing engines, or a mapping of types of files to a predefined order in which processing engines are to be selected to process the file/file chunk.

In response to determining the processing engine to process the file/file chunk, data layer 112 causes the first processing engine to process the file/file chunk. Data layer 112 can allocate a compute resource to process the file/file chunk and the compute resource selects and uses the first processing engine to process the file/file chunk. For example, data layer 112 allocates a worker in cluster 115 to process the file/file chunk (or a set of workers to process a set of file chunks).

According to various embodiments, each compute resource that is allocatable to process file/file chunk is configured with a plurality of processing engines. Information ingesting service 110 (e.g., the compute resource(s)) can use a processing engine selection policy in connection with determining a processing engine to process the file/file chunk. The select policy can include one or more of a mapping of files or file types to optimized processing engines, a predefined order in which processing engines are to be selected or according to which processing the file/file chunk is to fall back to, etc.

According to various embodiments, information ingesting service 110 (e.g., data layer 112 or a worker in cluster 115) determines a plan for processing the file/file chunk, including determining a particular processing engine to start processing the file/file chunk. Data layer 112 (e.g., a worker in cluster 115) determines the particular processing engine to use to process the file/file chunk based at least in part on one or more predefined heuristics. The one or more predefined heuristics can be set based on a selection policy defined by an administrator (e.g., via administrator system 130) or determined by information ingesting service 110 based on historical information pertaining to processing other files/file chunks, such as files/file chunks having a similar format, etc. In some embodiments, data layer 112 (e.g., a worker in cluster 115) determines the first processing engine, from among a set of processing engines, based on a determination of the processing engine that is optimized for (or deemed best at) processing the file/file chunk. As an example, data layer 112 (e.g., a worker in cluster 115) queries a mapping of types of files (or formats for files) to optimized processing engines, or a mapping of types of files to a predefined order in which processing engines are to be selected to process the file/file chunk. In response to determining the first processing engine, the worker in cluster 115 uses the first processing engine to process the file/file chunk Information ingesting service 110 monitors processing of the file/file chunk (or set of file chunks). In some embodiments, information ingesting service 110 is configured to detect occurrence of an error and to log the error, such as in an error log. Monitoring of the processing of the file/file chunk can be implemented by data layer 112 or a primary node in cluster 115, etc. In response to detecting an error or determining that the error is a parsing error, data layer 112 determines whether to perform a fallback to another processing engine (e.g., a fallback processing engine). For example, data layer 112 (e.g., the worker in cluster 115 performing the processing of the file chunk) performs a lookup in the error log to obtain an error code associated with the error. Data layer 112 (e.g., the worker in cluster 115) can use the error code in connection with determining whether the error is a parsing error. Data layer 112 (e.g., the worker in cluster 115) can further use the error code in connection with determining a particular type of parsing error that occurred. In various embodiments, parsing errors comprise one or more of the following: missing commas, bad numbers (e.g., 1.23.4.4, or NaN), using single quotes, missing quotation marks, unescaped special character, or any other appropriate error.

In some embodiments, data layer 112 (e.g., the worker in cluster 115 performing the processing of the file chunk) determines to invoke a fallback processing engine (e.g., an alternative processing engine from a set of processing engines) in response to determining that a parsing error occurred. For example, based on the type of error or error code associated with the error, data layer 112 (e.g., the worker in cluster 115) determines whether the current processing engine is optimized (or equipped) to handle the particular error. In response to determining that the current processing engine is optimized (or equipped) to handle the particular error, data layer 112 (e.g., the worker in cluster 115) can determine to use the current processing engine to resume/continue processing the file/file chunk and/or to cause the current processing engine to continue or re-attempt such processing. Conversely, in response to determining that the current processing engine is not optimized (or equipped) to handle the particular error, data layer 112 (e.g., the worker in cluster 115) can determine to invoke a fallback processing engine with which processing of the file/file chunk is to be continued. Data layer 112 (e.g., the worker in cluster 115) can further cause the fallback processing engine to continue processing the file/file chunk.

According to various embodiments, in response to detecting that a parsing error during processing of the file/file chunk and determining to invoke a fallback processing engine, data layer 112 (e.g., the worker in cluster 115) determines the fallback processing engine to which processing of the file/file chunk is to fall back to. For example, the fallback processing engine can be selected from a set of one or more fallback processing engines. As another example, the system has a single fallback processing engine to which processing can fall back to. In the case of information ingesting service 110 (e.g., each compute resource allocatable to processing a file/file chunk) comprising a plurality of fallback processing engines, data layer 112 (e.g., the worker in cluster 115) selects a particular fallback processing engine from among the plurality of fallback processing engines.

In some embodiments, data layer 112 (e.g., the worker in cluster 115) selects the particular fallback processing engine to which to fall back to based at least in part on (i) a predefined order of processing engines, and (ii) a type of error that occurred. In response to determining that processing of the file/file chunk is to fall back to a fallback processing engine, data layer 112 (e.g., the worker in cluster 115) obtains the applicable predefined order and determines the fallback engine to which processing is to fall back to based on a first processing engine that is not expected to succumb to the same error (e.g., the particular type of parsing error that occurred). For example, in response to obtaining the predefined order, data layer 112 (e.g., the worker in cluster 115) determines a next processing engine in the predefined order and determines whether the next processing engine is expected to succumb to the same error when processing the file/file chunk. In response to determining that the next processing engine is expected to succumb to the same error, data layer 112 (e.g., the worker in cluster 115) determines to skip the next processing engine. In connection with skipping the next processing engine, data layer 112 (e.g., the worker in cluster 115) determines a subsequent processing engine and then in turn determines whether such subsequent processing engine is expected to succumb to the same error. Data layer 112 (e.g., the worker in cluster 115) can sequentially determine next processing engines according to the predefined order until the system identifies a processing engine that is not expected to succumb to the same problem. In some embodiments, determining a fallback processing engine includes looking ahead in what is to be processed (e.g., the code, the data, etc.) to determine likely future errors (whether the same or other errors) to enable determination of which fallback processing engine to use and potentially for how long to use the fallback processing engine before returning to the original processing engine.

Information ingesting service 110 (e.g., data layer 112 or a worker in cluster 115) can log a location at which information parsed from a file/file chunk was last stored in the allocated memory space when the error occurred. In some embodiments, the applicable compute resource (e.g., the worker in cluster 115) continues writing information parsed from the file/file chunk to the memory space from the location at which the information was last successfully stored (e.g., the logged location). In some embodiments, the applicable compute resource (e.g., the worker in cluster 115) continues writing information parsed from the file/file chunk (e.g., using the fallback processing engine(s)) to the memory space allocated to the particular processing engine performing the processing of that part of the file/file chunk. Each processing engine may be allocated a different memory space in memory.

In response to determining that the worker in cluster 115 has completed processing the file/file chunk, data layer 112 (e.g., the worker) can combine the results from each processing engine during the processing of the file chunk to obtain an aggregated file chunk processing result (e.g., a data entity such as a table for the file chunk). For example, data layer 112 combines a result from processing part of the file/file chunk with an initial processing engine (e.g., the first processing engine) with result(s) from processing other part(s) with one or more fallback processing engines. Data layer 112 can store the aggregated file chunk processing result as a data entity in a dataset stored on data store 120, etc.

In response to determining that the file chunks corresponding to a file have been successfully processed, data layer 112 obtains the respective aggregated file chunk processing results corresponding to the file chunks (or a location of such results, etc.) and combines the respective aggregated file chunk processing results to obtain an aggregated file processing result. Data layer 112 can store the aggregated file processing result as a data entity in a dataset stored on data store 120, etc.

In some embodiments, information ingesting service 110 uses control layer 114 to respond to queries for data with respect to a particular data entity or in connection with controlling performing the processing of various files/file chunks. As an example, client system 140 uses an API to connect to information ingesting service and configure one or more settings for processing a file/file chunk or to query a particular data entity (or set of data entities). Control layer 114 receives the configurations, queries, etc. from the API, queries data store 120 for data responsive to the query and provides the data to the system or service requesting the data.

According to various embodiments, system 100 comprises data store 120. System 100 uses data store 120 to store one or more datasets comprising data entities and data for the data entities. Data store 120 can store datasets for a plurality of tenants or customers serviced by information ingesting service 110.

According to various embodiments, system 100 comprises administrator system 130 for use by an administrator such as an administrator of information ingesting service 110 or an administrator of a user associated with data store 120 and/or an instance of information ingesting service 110. For example, administrator system 130 comprises a system for communication, data access, computation, etc. An administrator uses administrator system 130 to maintain a dataset stored in data store 120, to define and manage applications provided by system 100, to set data management policies, to set chunking policies, to set policies for selecting fallback processing engines, to set error handling policies, to provide various system configurations or settings, etc. For example, an administrator uses administrator system 130 to define one or more security policies that are to be enforced (e.g., by information ingesting service 110, data layer 112, and/or control layer 114) with respect to a data stored at data store 120. In some embodiments, administrator system 130 communicates with information ingesting service 110 via a web-interface (e.g., by using a web browser, etc.). For example, administrator system 130 communicates with information ingesting service 110 via a web-browser installed on administrator system 130 (e.g., via a user interface configured by an application running on information ingesting service 110). In some embodiments, administrator system 130 communicates with information ingesting service 110 via an application or service running on administrator system 130 (e.g., a connector or API corresponding to information ingesting service 110).

According to various embodiments, information ingesting service 110 comprises business application layer 116. Information ingesting service 110 uses business application layer 116 to provide an interface via which a user (e.g., using administrator system 130, client system 140, etc.) may interact with various applications such as a development application for developing a feature or model for analyzing the data stored in the data store 120, an application for querying a dataset stored in data store 120, an application for analyzing/manipulating a data entity (e.g., a table, the dataset, etc.), an application to access files stored in a dataset (e.g., a dataset stored in data store 120), an application to perform dataset cleanup such as compaction operations, etc. Various other applications can be provided by business application layer 116. For example, a user queries data layer 112 by sending a query/request to business application layer 116, which interfaces with data layer 112 to obtain information responsive to the query (e.g., business application layer 116 formats the query according to the applicable syntax and send the formatted query to data layer 112). As another example, an administrator uses an interface provided/configured by business application layer 116 to configure (e.g., define) one or more security policies, including configuring access permissions to files, data entities, and/or one or more data management policies.

According to various embodiments, system 100 comprises client system 140. Client system 140 is used by a user such as a user corresponding to a data recipient (e.g., a developer such as a developer of code, a developer of a model, a user consuming the information ingested by information ingesting service 110 processing a file, a user of an organization associated with a one or more datasets stored at data store 120, etc.) to communicate with information ingesting service 110 (e.g., a business application layer 116.) and/or data stored in data store 120. As an example, client system 140 communicates with information ingesting service 110 via a web-interface. In some embodiments, client system 140 communicates with information ingesting service 110 via an application or service running on client system 140 (e.g., a module such as a connector or API that interfaces with information ingesting service 110). In some embodiments, a user uses client system 140 to develop code on a business application layer, which makes a call to with respect to data exposed via information ingesting service 110, or to invoke a task to be performed with respect to certain data stored in data store 120 (e.g., to update a data entity, to recompute a data entity, etc.), to modify code at a business application (e.g., to execute code against data stored in data store 120), to query data store 120 or a data share corresponding to a subset of data (e.g., data objects) within data store 120 (e.g., in connection with discovering code, a library, a module, etc.), etc.

According to various embodiments, system 100 comprises data source 150. Data source 150 can provide data to be processed by information ingesting service 110 and stored in datasets on data store 120. For example, information ingesting service 110 can ingest data provided by data source 150.

Figure 2:
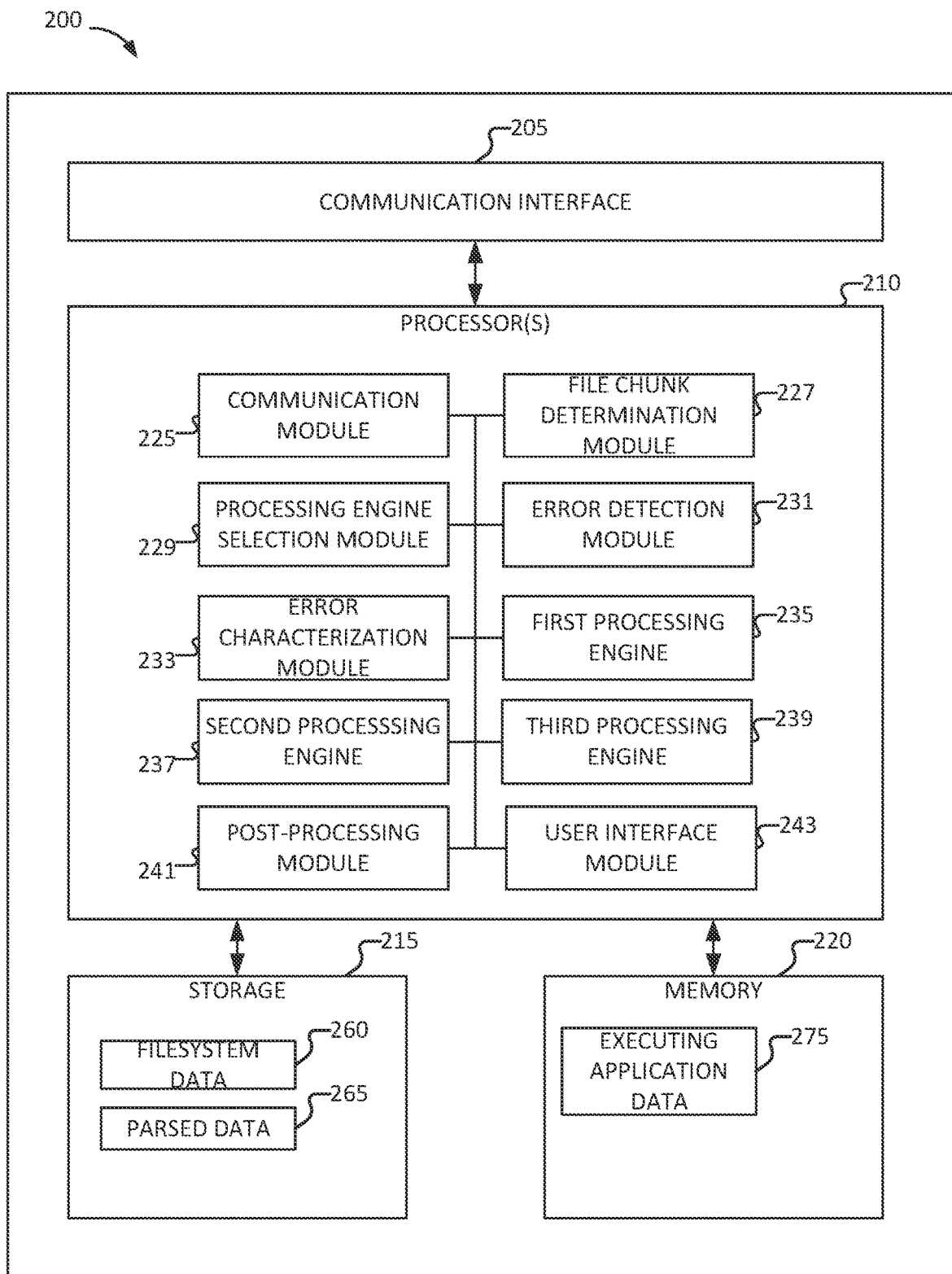
FIG. 2 is a block diagram of an information ingesting service according to various embodiments of the present application.

FIG. 2 is a block diagram of an information ingesting service according to various embodiments of the present application. According to various embodiments, system 200 implements at least part of process 300, process 400 of FIG. 4, process 500 of FIG. 5, process 600 of FIG. 6, process 700 of FIG. 7, process 800 of Figure, process 900 of FIG. 9, process 1000 of FIG. 10, and/or process 1100 of FIG. 11. In some embodiments, system 200 is implemented by data layer 112 of information ingesting service 110, such as by a worker in cluster 115 of data layer 112.

In the example shown, system 200 implements one or more modules in connection with managing data, ingesting files to obtain information (e.g., information configured as one or more corresponding data entities), chunking files to obtain a set of chunks, mediating access to information obtained by ingesting files, and/or to cause a corrective action to be performed in response to a data entity being corrupted, updated, deleted, replaced, etc. System 200 comprises communication interface 205, one or more processors 210, storage 215, and/or memory 220. One or more processors 210 comprises, or implements, one or more of communication module 225, file chunk determination module 227, processing engine selection module 229, error detection module 231, error characterization module 233, first processing engine 235, second processing engine 237, third processing engine 239, post-processing module 241, and/or user interface module 243. Although the example illustrated in FIG. 2, includes first processing engine 235, second processing engine 237, third processing engine 239, system 200 can include two or more processing engines (e.g., a set of fallback engines).

In some embodiments, system 200 comprises communication module 225. System 200 uses communication module 225 to communicate with various other systems such as a user system, an administrator system, a data source (e.g., from which files comprising information to be ingested are received), and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request to configure an information ingesting service, a data management policy, a security policy, an access policy, a chunking policy, a fallback policy, an error handling policy, a processing engine selection policy, a storage system configuration such as a configuration for a partitioning of data, a query for data, a selection of a corrective action, etc. The user input to the user system can include the creation of a new file, a modification or update to a file, a query for a file (e.g., a csv file, a library, a module, etc.), a query for a data entity, a request to set one or more security policies (e.g., a permission with respect to accessing a file or a directory), a request to set one or more policies, such as data management policies, chunking policies, error handling policies, fallback policies, processing engine selection policies, a request to set one or more data access permissions, etc. Communication module 225 is configured to provide various user systems or data requesting services with information such as user interface (e.g., an interface corresponding to a workspace or notebook), information that is responsive to one or more queries or tasks requested to be executed, locations at which data is to be accessed, credentials for accessing data, URLs corresponding to locations at which data responsive to data access requests can be retrieved, etc. In some embodiments, communication module 225 communicates data responsive to data requests (e.g., queries to a dataset that has been clustered into a set of files, etc.).

In some embodiments, system 200 comprises a file chunk determination module 227. System 200 uses file chunk determination module 227 to determine whether to chunk a file, such as in connection with ingesting information from the file, and/or to determine a set of file chunks corresponding to a file. According to various embodiments, the system determines whether to process an obtained larger file or whether to segment (e.g., chunk) the file into smaller files (also referred to herein as file chunks). File chunk determination module 227 can determine whether to segment/chunk the file into a set of file chunks based at least in part on a predefined chunking policy (e.g., stored in storage 215 or memory 220). In some embodiments, the chunking policy defines a desired (e.g., optimized) number of file chunks into which a file is to be processed, such as based on a set of compute resources that can be allocated to process the corresponding set of file chunks in parallel.

According to various embodiments, file chunk determination module 227 determines (or be preset with) an optimal size of file chunks or an optimal range of sizes for file chunks. In some embodiments, file chunk determination module 227 determines an optimal size/size range of file chunks based at least in part on (i) optimizing an amount/percentage of a file chunk being processed by the preferred processing engine (e.g., the processing engine optimized to process the particular type of file chunk or file format), and/or (ii) minimizing the amount/percentage of a file chunk being processed by a non-preferred processing engine (e.g., a fallback processing engine). In some embodiments, an analysis is performed on a chunk to determine the type of processing likely needed for the chunk and matching the processing needs to a preferred processing engine or a preferred ordered list of processing engines. For example, before processing, each processing engine, P1 . . . Pn, has a feature set it supports, and an associated processing speed; an analysis is run on a sample of the input to capture the required parsing features, then an order is selected for the processing engines by which engine supports more features breaking ties with processing speed.

In some embodiments, file chunk determination module 227 determines to segment a file into a set of file chunks. As system 200 (e.g., first processing engine 235, second processing engine 237, third processing engine 239, etc.) is processing at least a subset of the file chunks, the system can determine to increase (e.g., extend) the size of the current file chunk(s) being processed if file chunk determination module 227 observes that the file is being processed by the preferred processing engine without succumbing to an error (e.g., a particular error such as a parsing error). For example, file chunk determination module 227 dynamically determines the size of a file chunk to be processed.

In some embodiments, system 200 comprises processing engine selection module 229. System 200 uses processing engine selection module 229 to (i) select a processing engine (e.g., first processing engine 235, second processing engine 237, third processing engine 239, etc.) to use in processing the file/file chunk, and/or (ii) select a fallback processing engine to which processing of the file/file chunk is to fall back to. The system determines a particular processing engine to start processing the file/file chunk (also referred to herein as the first processing engine or a preferred processing engine). In some embodiments, processing engine selection module 229 determines the particular processing engine to use to process the file/file chunk based at least in part on one or more predefined heuristics. The one or more predefined heuristics can be set based on a selection policy defined by an administrator or determined by the system based on historical information pertaining to processing other files/file chunks, such as files/file chunks having a similar format, etc. Processing engine selection module 229 can determine an initial processing engine (e.g., first processing engine 235), from among a set of processing engines, based on a determination of the processing engine that is optimized for (or deemed best at) processing the file/file chunk. As an example, processing engine selection module 229 queries a mapping of types of files (or formats for files) to optimized processing engines, or a mapping of types of files to a predefined order in which processing engines are to be selected to process the file/file chunk. In response to determining the initial processing engine, processing engine selection module 229 can provide an indication of such selected initial processing engine, and system 200 causes the initial processing engine to process the file/file chunk.

System 200 uses processing engine selection module 229 to determine whether to continue processing the file/file chunk using a different processing engine (e.g., to fall back to a fallback processing engine). In some embodiments, processing engine selection module 229 determines to fall back to a fallback processing engine in response to detection of an error (e.g., a particular type of error such as a parsing error). In response to determining that processing of the file/file chunk is to fall back to a fallback processing engine, processing engine selection module 229 determines (e.g., selects) the processing engine to which processing is to fall back to. For example, the fallback processing engine can be selected from a set of one or more fallback processing engines. As another example, the system has a single fallback processing engine to which processing can fall back to. In the case of the system comprising a plurality of fallback processing engines, the system selects a particular fallback processing engine from among the plurality of fallback processing engines. As an illustrative example, if system 200 comprises only three processing engines (e.g., first processing engine 235, second processing engine 237, and third processing engine 239) and if processing a particular file chunk using first processing engine 235 succumbs to a parsing error, processing engine selection module 229 determines to invoke a fallback to a fallback processing engine and selects a fallback processing engine from second processing engine 237 and third processing engine 239.

In some embodiments, processing engine selection module 229 selects the particular fallback processing engine to which to fall back to based on a type of error that occurred (e.g., by querying an error log updated by error characterization module 233). For example, the particular fallback processing engine is selected based on a capability or characteristics of the processing engine. As another example, processing engine selection module 229 obtains the type of parsing error and determines a particular fallback processing engine among the plurality of processing engines that is optimized for handling the error or the type of file (e.g., file format, syntax, etc.). As another example, the processing engine optimized for handling the error or the type of file can correspond to a processing engine for which an expected likelihood that such processing engine successfully complete processing of the file/file chunk is the highest among the plurality of processing engines. As another example, the processing engine optimized for handling the error or the type of file can correspond to a preset definition of processing engines to handle certain errors or types of files. The particular fallback processing engine to which processing of the file/file chunk is to fall back to can be selected based on a determination that the particular processing engine is not expected to succumb to the same error. As an example, the particular processing engine is selected based on a determination that the particular processing engine is not expected to succumb to the same error or another parsing error.

In some embodiments, processing engine selection module 229 selects the particular fallback processing engine to which to fall back to based at least in part on a predefined order of processing engines. In response to determining that processing of the file/file chunk is to fall back to another processing engine, processing engine selection module 229 obtains the applicable predefined order of processing engines and determines the particular fallback processing engine according to the predefined order. For example, processing engine selection module 229 determines the particular fallback processing engine to be a next processing engine in the predefined order.

In some embodiments, processing engine selection module 229 selects the particular fallback processing engine to which to fall back to based at least in part on (i) a predefined order of processing engines, and (ii) a type of error that occurred. In response to determining that processing of the file/file chunk is to fall back to a fallback processing engine, processing engine selection module 229 obtains the applicable predefined order and determines the fallback engine to which processing is to fall back to based on a first processing engine that is not expected to succumb to the same error (e.g., the particular type of parsing error that occurred). For example, in response to obtaining the predefined order, processing engine selection module 229 determines a next processing engine in the predefined order and determines whether the next processing engine is expected to be susceptible to the same error when processing the file/file chunk. In response to determining that the next processing engine is expected to be susceptible to the same error, processing engine selection module 229 determines to skip the next processing engine. In connection with skipping the next processing engine, processing engine selection module 229 determines a subsequent processing engine and then in turn determines whether such subsequent processing engine is expected to be susceptible to the same error. Processing engine selection module 229 sequentially determines next processing engines according to the predefined order until the system identifies a processing engine that is not expected to be susceptible to the same problem.

In some embodiments, system 200 comprises error detection module 231. System 200 uses error detection module 231 to monitor processing of a file/file chunk by a processing engine, and to detect (e.g., determine whether) the occurrence of an error during processing of the file/file chunk. In response to detecting an error, error detection module 231 can provide an indication that the error occurred to process engine selection module 229 and/or error characterization module 233.

In some embodiments, system 200 comprises error characterization module 233. System 200 uses error characterization module 233 to determine a type of error that is detected and to log the error (and the type of error) in the error log. In response to detecting an error, error detection module 231 provides to error characterization module 233 an indication that an error is detected. In response to receiving the indication that the error is detected, error characterization module 233 can determine a type of error that occurred. For example, error characterization module 233 obtains (e.g., receives from error detection module 231 or generates) an error code corresponding to the error.

In some embodiments, system 200 uses detection of a certain error, such as a parsing error, as an indication to invoke a fallback processing engine to continue processing the file/file chunk. For non-parsing errors, system 200 continues to use the current processing engine (e.g., restart processing of the file/file chunk using the current processing engine). In some embodiments, error characterization module 233 determines and/or stores an error code in connection with logging an error. Error characterization module 233 system can associate the error code with an indication that an error occurred. As an example, error characterization module 233 can use the error code in connection with determining a type of processing error. As another example, error characterization module 233 uses error codes to more granularly classify errors such as using error codes to distinguish different types of parsing errors. The error can be logged by the current processing engine, a service that manages processing a file by one or more compute resources, etc.

In response to determining that an error occurred (e.g., based on receiving an indication from error detection module 231), processing engine selection module 229 determines whether to invoke a fallback of processing the file/file chunk to a fallback processing engine. In some embodiments, in response to determining that an error occurred, processing engine selection module 229 determines whether the error corresponds to a parsing error. For example, processing engine selection module 229 performs a lookup in the error log to obtain an error code associated with the error. Processing engine selection module 229 uses the error code in connection with determining whether the error is a parsing error. In response to determining the error code, processing engine selection module 229 uses the error code in connection with determining a particular type of parsing error that occurred.

In some embodiments, processing engine selection module 229 determines to invoke a fallback processing engine (e.g., an alternative processing engine from a set of processing engines) in response to determining that a parsing error occurred. For example, based on the type of error or error code associated with the error, processing engine selection module 229 determines whether the current processing engine is optimized (or equipped) to handle the particular error. In response to determining that the current processing engine is optimized (or equipped) to handle the particular error, processing engine selection module 229 determines to use the current processing engine to resume/continue processing the file/file chunk and/or to cause the current processing engine to continue such processing. Conversely, in response to determining that the current processing engine is not optimized (or equipped) to handle the particular error, processing engine selection module 229 determines to invoke a fallback processing engine with which processing of the file/file chunk is to be continued and processing engine selection module 229 proceeds to select the processing engine to which to fall back the processing of the file/file chunk.

In response to detecting that an error occurred (e.g., a parsing error) and determining to invoke a fallback processing engine, processing engine selection module 229 determines the fallback processing engine to which processing of the file/file chunk is to fall back to. For example, the fallback processing engine is selected from a set of one or more fallback processing engines. As another example, the system has a single fallback processing engine to which processing can fallback, in which case the single fallback processing engine is the predefined processing engine to which processing of the file/file chunk is to fall back. In the case of system 200 comprising a plurality of fallback processing engines (such as second processing engine 237 and third processing engine 239), processing engine selection module 229 selects a particular fallback processing engine from among the plurality of fallback processing engines.

In some embodiments, processing engine selection module 229 selects the particular fallback processing engine to which to fall back to based on a type of error that occurred. For example, the particular fallback processing engine is selected based on a capability or characteristics of the processing engine and the error that occurred (e.g., to determine a fallback processing engine capable of processing the file in view of the error that occurred). As another example, processing engine selection module 229 determines the type of parsing error and determines a particular fallback processing engine among the plurality of processing engines that is optimized for handling the error or the type of file (e.g., file format, syntax, etc.). As another example, the processing engine optimized for handling the error or the type of file can correspond to a processing engine for which an expected likelihood that such processing engine is to successfully complete processing the file/file chunk is the highest among the plurality of processing engines. As another example, the processing engine optimized for handling the error or the type of file can correspond to a preset definition of processing engines to handle certain errors or types of files. The particular fallback processing engine to which processing of the file/file chunk is to fall back to can be selected based on a determination that the particular processing engine is not expected to succumb to the same error. As an example, the particular processing engine is selected based on a determination that the particular processing engine is not expected to succumb to the same error or another parsing error.

In some embodiments, the system selects the particular fallback processing engine to which to fall back to based at least in part on a predefined order of processing engines. The system can store a single predefined order of processing engines, or a plurality of predefined orders of processing engines. For example, the system can store a plurality of predefined orders of processing engine for a plurality of different types of files (e.g., various file formats, syntax, etc.). In response to determining that processing of the file/file chunk is to fall back to another processing engine, processing engine selection module 229 obtains the applicable predefined order of processing engines and determines the particular fallback processing engine according to the predefined order. For example, processing engine selection module 229 determines the particular fallback processing engine to be a next processing engine in the predefined order.

In some embodiments, processing engine selection module 229 selects the particular fallback processing engine to which to fall back to based at least in part on (i) a predefined order of processing engines, and (ii) a type of error that occurred. In response to determining that processing of the file/file chunk is to fall back to a fallback processing engine, processing engine selection module 229 obtains the applicable predefined order and determines the fallback engine to which processing is to fall back to based on a first processing engine that is not expected to succumb to the same error (e.g., the particular type of parsing error that occurred). For example, in response to obtaining the predefined order, processing engine selection module 229 determines a next processing engine in the predefined order and determines whether the next processing engine is expected to succumb to the same error when processing the file/file chunk. In response to determining that the next processing engine is expected to succumb to the same error, processing engine selection module 229 determines to skip a next processing engine. In connection with skipping the next processing engine, processing engine selection module 229 determines a subsequent processing engine and then in turn determines whether such subsequent processing engine is expected to succumb to the same error. Processing engine selection module 229 can sequentially determine next processing engines according to the predefined order until processing engine selection module 229 identifies a processing engine that is not expected to succumb to the same problem.

In some embodiments, system 200 comprises two or more of first processing engine 235, second processing engine 237, and/or third processing engine 239. System 200 uses first processing engine 235, second processing engine 237, and/or third processing engine 239 in connection with processing various types of files/file chunks. In some embodiments, each of first processing engine 235, second processing engine 237, and/or third processing engine 239 are optimized differently. For example, each of first processing engine 235, second processing engine 237, and/or third processing engine 239 are optimized to handle a different type of file (e.g., file format, syntax, etc.) or to handle a different set of error types.

During processing of the file/file chunk (e.g., to ingest information from the file/file chunk), the applicable processing engine(s) store information parsed from the file/file chunk in a memory space allocated to the processing engine or the corresponding compute resource. The processing engine(s) can store the information in storage 215 (e.g., parsed data 265) or memory 220. In some embodiments, each processing engine has a different memory space to which information obtained during parsing a file/file chunk is to be stored. As another example, a memory space is allocated for a particular file/file chunk or for a particular compute resource such that a processing engine processing a file/file chunk and a fallback processing engine to which processing of the file/file chunk falls back store information parsed from the file/file chunk in a same memory space. For example, each processing engine invoked in connection with processing a file/file chunk (e.g., an initial processing engine and one or more fallback processing engines) stores information parsed from the file/file chunk in the same memory space. The processing engines invoked in connection with processing a file/file chunk can store information parsed from the file/file chunk at adjacent parts of the same memory space.

In some embodiments, system 200 (e.g., the applicable processing engine) logs a location at which information parsed from a file/file chunk was last stored in the allocated memory space when the error occurred. System 200 can continue writing information parsed from the file/file chunk to the memory space from the location at which the information was last successfully stored (e.g., the logged location). For example, processing engine selection module 229 determines a location of the part of the file last successfully processed and instructs the fallback processing engine to continue processing the file/file chunk from the location.

In some embodiments, a plurality of file chunks associated with a file are processed in parallel. Parallel processing such plurality of file chunks can be implemented by a plurality of systems 200 operating in parallel, or by two or more of the processing engines comprised in system 200.

In response to determining that a file is to be processed, the system (e.g., system 200, or an information ingesting service implementing system 200) allocates a set of compute resources for processing the file/file chunk. The set of compute resources allocated for processing the file/file chunk can be determined based at least in part on one or more characteristics of the file, such as size, file type, syntax, format, etc. In the case of a plurality of systems 200 operating in parallel, each system 200 comprises at least one compute resource that implements first processing engine 235, second processing engine 237, and/or third processing engine 239. In the case of system 200 performing parallel processing of a plurality of file chunks, system 200 comprises a plurality of compute resources and each compute resource implements a plurality of processing engines (e.g., an initial/optimized processing engine and at least one fallback processing engine).

In some embodiments, the system (e.g., system 200, or an information ingesting service implementing system 200) determines to implement parallel processing in response to a determination that such processing is more efficient than serial processing or using a single compute resource to process the large file. For example, the system determines to implement parallel processing in response to determining that an expected cost savings for parallel processing exceeds a predefined cost savings threshold. In response to determining to implement the parallel processing to process the file/file chunk, the system allocates the set of compute resources to process at least a subset of the set of file chunks for a file. For example, the system determines the set of file chunks based on the number of compute resources that can be allocated to processing the file. As another example, the system determines the set of file chunks based on one or more characteristics of the file and determines a compute resource (from the set of compute resources allocated to process the file) to allocate for processing each particular file chunk. A particular compute resource can be allocated to processing a plurality of file chunks (e.g., the compute resource serially processes those plurality of file chunks allocated to the compute resource).

In some embodiments, each compute resource in the set of compute resource can implement a set of processing engines such as first processing engine 235, second processing engine 237, and/or third processing engine 239. The method of falling back to a fallback processing engine in the event of an error in processing a file/file chunk can be implemented by a particular compute resource. For example, a particular compute resource that succumbs to a parsing error can continue processing the file chunk with a different processing engine (e.g., the fallback processing engine), and another compute resource that is processing another file chunk can continue to use the preferred processing engine until a parsing error occurs.

In some embodiments, system 200 comprises post-processing module 241. System 200 uses post-processing module 241 to combine the results of processing a particular file chunk by a plurality of processing engines and/or to combine the results of a plurality of file chunks by a plurality of compute resources operating in parallel, etc.

According to various embodiments, post-processing module 241 combines the results obtained from each processing engine during the processing of the file chunk to obtain an aggregated file chunk processing result (e.g., a data entity such as a table for the file chunk). For example, in the case that system 200 parses the file chunks to obtain a table and a parsing error occurred during processing a file chunk, a first processing engine can obtain results for a subset of rows of the table and one or more fallback processing engines can respectively obtain results for corresponding subset(s) of rows of the table. In response to determining that processing the file chunk has completed, post-processing module 241 obtains the results from the initial processing engine (e.g., first processing engine 235) engine and any fallback processing engines (e.g., second processing engine 237, third processing engine 239, etc.) used to process the file chunk (e.g., obtains locations in a memory space(s) at which the results are stored) and combines the results to obtain the aggregated file chunk processing result for the file chunk.

According to various embodiments, if a file is chunked and a corresponding set of file chunks are processed by the system, post-processing module 241 obtains the respective aggregated file chunk processing results corresponding to the file chunks (or a location of such results, etc.) and combines the respective aggregated file chunk processing results to obtain an aggregated file processing result. Post-processing module 241 can store the aggregated file processing result in parsed data 265 of storage 215 or remotely in a distributed data storage system. For example, the aggregated file processing result can be a data entity such as a table.

In some embodiments, system 200 comprises user interface module 243. System 200 uses user interface module 243 to provide a user interface to a user (e.g., via a client system, etc.) via which the user configures, defines, develops data entities, data recipients to be provided access to such data entities, access permissions with respect to the data recipients and/or data entities, and/or configures a one or more policies, etc.

According to various embodiments, storage 215 comprises one or more of filesystem data 260 and parsed data 265. Storage 215 comprises a shared storage (e.g., a network storage system) and/or database data, and/or user activity data.

In some embodiments, filesystem data 260 comprises a database such as one or more datasets for data entities (e.g., one or more datasets for one or more features, models, schemas, tables, etc.). File system data 260 can store various policies such as a chunking policy, a fallback policy, a processing engine selection policy, an error handling policy, etc.

In some embodiments, parsed data 265 comprises information pertaining to information ingested (e.g., parsed) from a file or file chunk. Parsed data 265 can include rows of data obtained based on parsing the file or file chunk.

According to various embodiments, memory 220 comprises executing application data 275. Executing application data 275 comprises data obtained or used in connection with executing an application such as an application executing in connection with managing data entities, an application executing to process jobs, an application that processes and/or responds to queries, an application for chunking data, an application for performing error handling, an application that enforces security of data in the storage system, an application that executes code being developed in a workspace, etc. In various embodiments, the application comprises one or more applications that perform one or more of receiving and/or executing a query or command, generating a report and/or configuring information that is responsive to an executed query or command, and/or providing to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
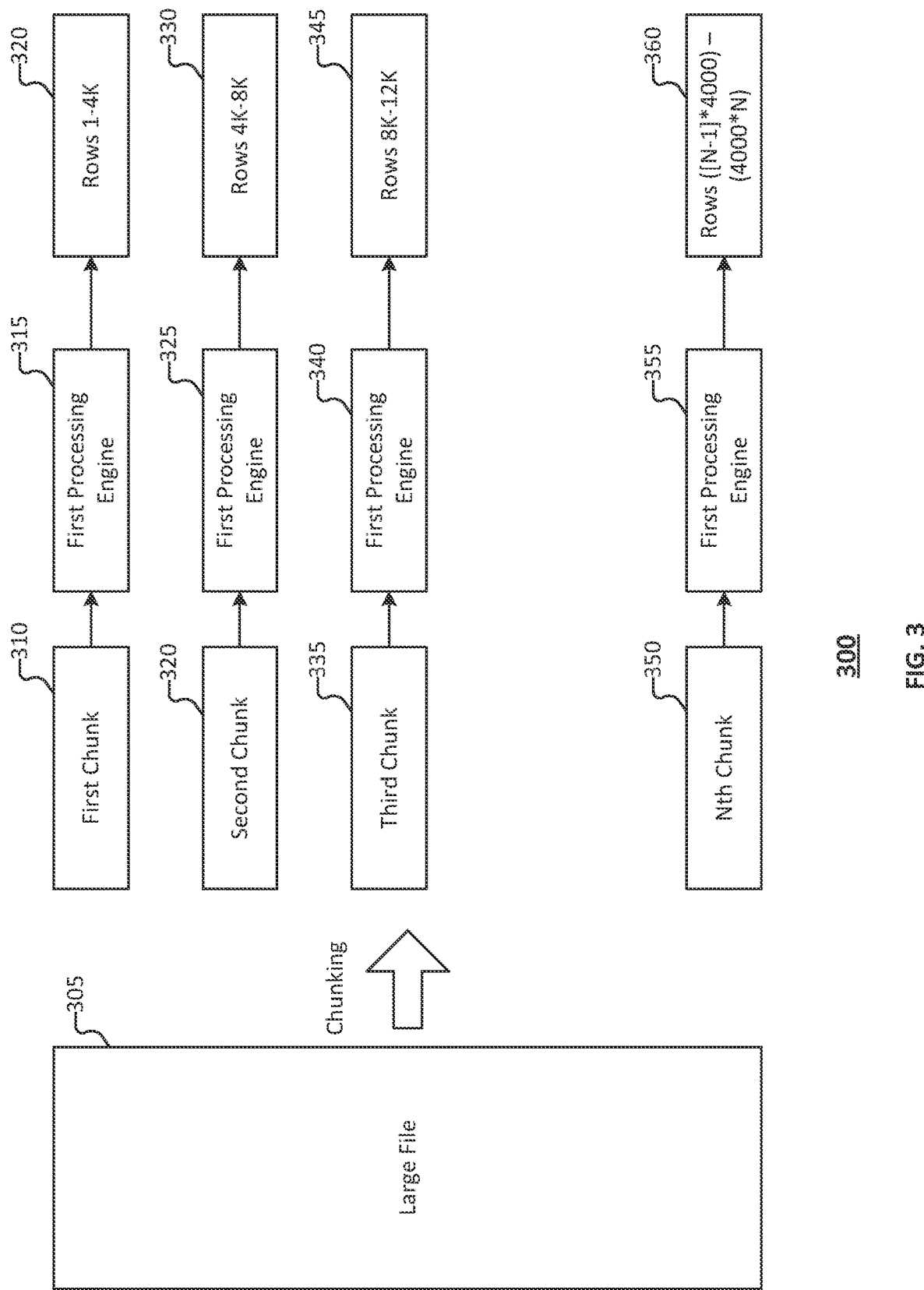
FIG. 3 is a flow diagram of a method for processing file chunks according to various embodiments of the present application.

FIG. 3 is a flow diagram of a method for processing file chunks according to various embodiments of the present application. In some embodiments, process 300 is implemented by system 100 of FIG. 1 and/or system 200 of FIG. 2.

At 305, the system receives an indication that a large file is to be processed (e.g., information in the large file is to be ingested by the system and stored as data entities, such as tables). In response to receiving the indication that the large file is to be processed, the system determines whether to segment the file into a set of file chunks and separately process the respective file chunks. The system can use a chunking policy in connection with determining whether to segment the larger file and/or to determine parameters of the file chunks comprised in the set of file chunks.

In response to determining to segment the large file, the system obtains first chunk at 310, the system obtains second chunk at 320, the system obtains third chunk at 335, so on and so forth until the system obtains Nth chunk at 350, etc. collectively corresponding to the large file.

At 315, the system uses a first processing engine to process the first chunk. The first processing engine can be implemented by a first compute resource. In response to processing the first chunk, the first processing engine obtains rows 1-4000 (in the case that the file is segmented so that file chunk size corresponds to 4000 rows). At 320, the system stores the rows 1-4000 obtained by the first compute resource.

At 325, the system uses a first processing engine to process the second chunk. The first processing engine can be implemented by a second compute resource. In response to processing the second chunk, the first processing engine obtains rows 4000-8000 (in the case that the file is segmented so that file chunk size corresponds to 4000 rows). At 330, the system stores the rows 4000-8000 obtained by the second compute resource.

At 340, the system uses a first processing engine to process the third chunk. The first processing engine can be implemented by a third compute resource. In response to processing the third chunk, the first processing engine obtains rows 8000-12000 (in the case that the file is segmented so that file chunk size corresponds to 4000 rows). At 345, the system stores the rows 8000-12000 obtained by the third compute resource.

At 355, the system uses a first processing engine to process the Nth chunk, where N is a positive integer. The first processing engine can be implemented by an Nth compute resource. In response to processing the Nth chunk, the first processing engine obtains rows $(4000*(N-1))$–$(4000*N)$ (in the case that the file is segmented so that file chunk size corresponds to 4000 rows). At 360, the system stores the rows $(4000*(N-1))$–$(4000*N)$ obtained by the Nth compute resource.

According to various embodiments, the system uses a plurality of compute resources to process at least a plurality of the first chunk, second chunk, third chunk, . . . , Nth chunk. For example, the system processes 310, 320, 335, . . . , 350 in parallel with at least one of 315, 325, 340, . . . 355 to produce 320, 330, 345, . . . , 360.

The first processing engine used at 315, 325, and 340 can be a processing engine optimized to process a JSON file in the case that the large file is in JSON format.

Figure 4:
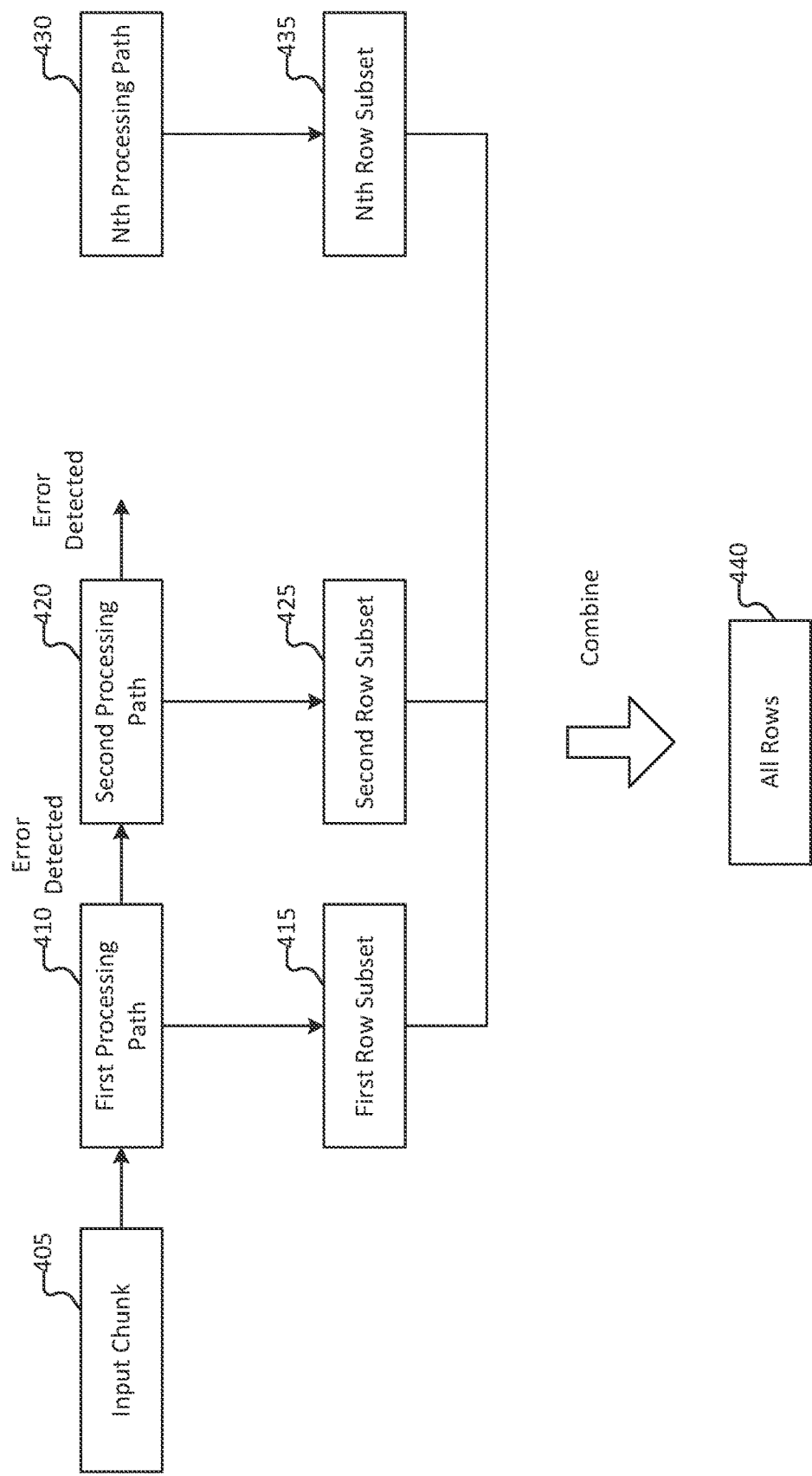
FIG. 4 is a flow diagram of a method for processing file chunks according to various embodiments of the present application.

FIG. 4 is a flow diagram of a method for processing file chunks according to various embodiments of the present application. In some embodiments, process 400 is implemented by system 100 of FIG. 1 and/or system 200 of FIG. 2.

At 405, a chunk is input. For example, the system allocates a compute resource to process the chunk and instructs the compute resource to begin processing the chunk.

At 410, the system determines to start processing the chunk using a first processing path. The first processing path can be optimized to process a file type or other characteristics of the chunk. The system can select the first processing path from among a set of processing paths based on a determination that the first processing is the optimal processing path from among the set of processing paths.

At 415, the system obtains and stores a first-row subset comprising rows that are obtained based on the processing of the chunk using the first processing path. The system obtains and stores the first-row subset (or parts of the first-row subset) while the first processing path proceeds through the chunk.

In response to detecting an error (e.g., a parsing error), process 400 proceeds to 420 at which the system uses a second processing path to continue processing the chunk. The second processing path can pick up processing the chunk from a location in the chunk at which the information in the chunk was last successfully processed. In some embodiments, the system determines to use the second processing path based at least in part on a determination that the error is a parsing error (e.g., other errors can be handled using other error handling mechanisms). In some embodiments, the system selects the second processing path from among the set of processing paths based on one or more of (i) a predefined order in which processing paths are to be invoked, and (ii) an error type corresponding to the parsing error (e.g., as identified by an error code).

At 425, the system obtains and stores a second-row subset comprising rows that are obtained based on the processing of the chunk using the second processing path. The system obtains and stores the second-row subset (or parts of the second-row subset) while the second processing path proceeds through the chunk.

In response to detecting an error (e.g., a parsing error) while processing the chunk using the second processing path, process 400 proceeds to process the chunk using another fallback processing path until the chunk is complete or an error is detected, and the system falls back to a subsequent fallback processing path. The system can sequentially progress through fallback processing paths until at 430 the system uses an Nth processing path to continue processing the chunk. Each fallback processing path can pick up processing the chunk from a location in the chunk at which the information in the chunk was last successfully processed by the previous processing path. In some embodiments, the system determines to use each sequential fallback processing path based at least in part on a determination that the error is a parsing error (e.g., other errors can be handled using other error handling mechanisms). In some embodiments, the system selects the corresponding fallback processing path from among the set of processing paths (or remaining processing paths of the set of processing paths) based on one or more of (i) a predefined order in which processing paths are to be invoked, and (ii) an error type corresponding to the parsing error (e.g., as identified by an error code).

At 435, the system obtains and stores an Nth row subset comprising rows that are obtained based on the processing of the chunk using the Nth processing path. The system obtains and stores the Nth row subset (or parts of the second-row subset) while the second processing path proceeds through the chunk.

At 440, the system obtains an aggregated file chunk processing result. For example, the system combines the rows respectively obtained by the processing paths invoked to process the file. In the example shown, the system combines the first-row subset obtained at 415, the second-row subset obtained at 425, . . . , and the Nth row subset obtained at 435.

According to various embodiments, at least one fallback processing engine is a JVM.

In some embodiments, a later processing path comprises an earlier processing path. In some embodiments, processing returns to an earlier processing engine in response to determining that the earlier processing engine is appropriate given a likelihood of succumbing to one or more likely errors to be encountered.

Figure 5:
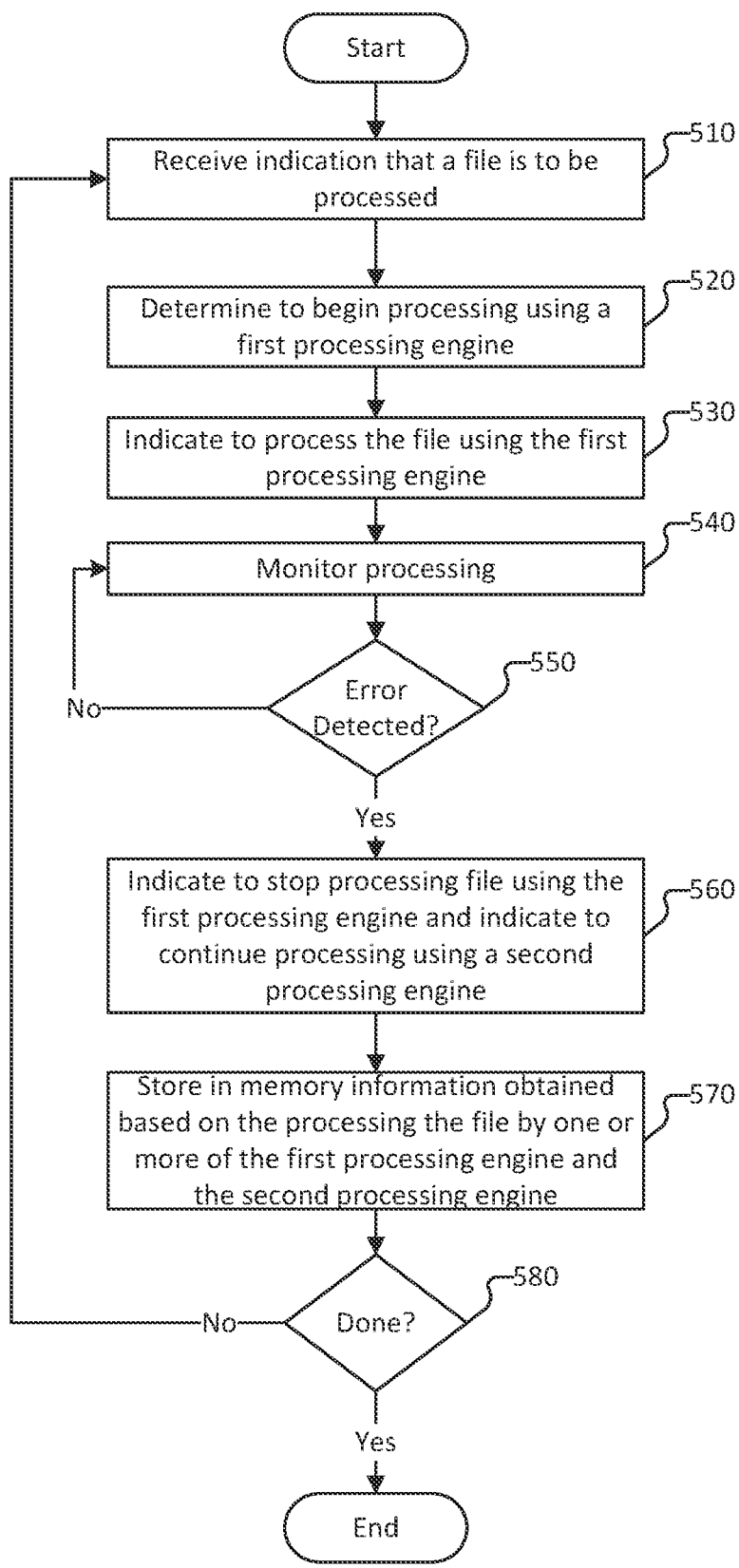
FIG. 5 is a flow diagram of a method for processing a file according to various embodiments of the present application.

FIG. 5 is a flow diagram of a method for processing a file according to various embodiments of the present application. In some embodiments, process 500 is implemented by system 100 of FIG. 1 and/or system 200 of FIG. 2.

At 510, an indication that a file is to be processed is received. The system can determine that the file is to be processed based on a request to process (e.g., ingest) the file or based on the system receiving the file.

At 520, a determination to begin processing the file using a first processing engine is made. In some embodiments, the system determines a particular processing engine to start processing the file/file chunk. The system can determine the particular processing engine (e.g., the first processing engine) to use to process the file/file chunk based at least in part on one or more predefined heuristics. The one or more predefined heuristics can be set based on a selection policy defined by an administrator or determined by the system based on historical information pertaining to processing other files/file chunks, such as files/file chunks having a similar format, etc. The first processing engine can be determined, from among a set of processing engines, based on a determination of the processing engine that is optimized for (or deemed best at) processing the file/file chunk. As an example, the system can query a mapping of types of files (or formats for files) to optimized processing engines, or a mapping of types of files to a predefined order in which processing engines are to be selected to process the file/file chunk. In response to determining the first processing engine, the system can cause the first processing engine to process the file/file chunk.

At 530, an indication is made to process the file using the first processing engine. In some embodiments, the system causes the compute resource to use the first processing engine to process the file. As an example, in response to the compute resource determining the first processing engine, the compute resource can instruct the first processing engine to process the file.

At 540, processing of the file is monitored. The system can monitor the processing of the file at the compute resource level, the processing engine level, or a level of the service managing the ingesting of information from the file. The system can monitor the processing of the file to detect errors (e.g., parsing errors) that occur during processing of the file using the first processing engine. In some embodiments, the system can monitor the storage of results from the processing engine and the location in memory where the results are stored.

At 550, a determination is made as to whether an error is detected. In some embodiments, the system determines whether an error is detected during processing of the file (e.g., by the first processing engine).

In response to determining that an error is not detected at 550, process 500 returns to 540 at which monitoring of the processing of the file is continued. For example, the system monitors processing the file until the earlier of the processing of the file being completed or an error is detected.

In response to determining that an error is detected at 550, process 500 proceeds to 560 at which an indication is made to stop processing the file using the first processing engine and indicate to continue processing the file using a second processing engine. In some embodiments, the second processing engine is selected from among a set of fallback processing engines. The compute resource can determine to continue processing the file using the second engine from a location in the file at which the first processing engine last successfully processed the file. In some embodiments, the second processing engine begins storing the results generated by the second processing engine at a position in memory just after the last position in memory that the first processing engine has stored results (e.g., just prior to the error stopped processing).

At 570, information obtained based on the processing of the file by one or more of the first processing engine and the second processing engine is stored in memory. The system can obtain results (e.g., subsets of rows) from the processing by the first processing engine and/or the second processing engine. In some embodiments, the system combines the results from the processing by the first processing engine and/or the second processing engine to obtain an aggregated file chunk processing result.

At 580, a determination is made as to whether process 500 is complete. In some embodiments, process 500 is determined to be complete in response to a determination that no further files are to be processed, a user has exited the system, an administrator indicates that process 500 is to be paused or stopped, etc. In response to a determination that process 500 is complete, process 500 ends. In response to a determination that process 500 is not complete, process 500 returns to 510.

Figure 6:
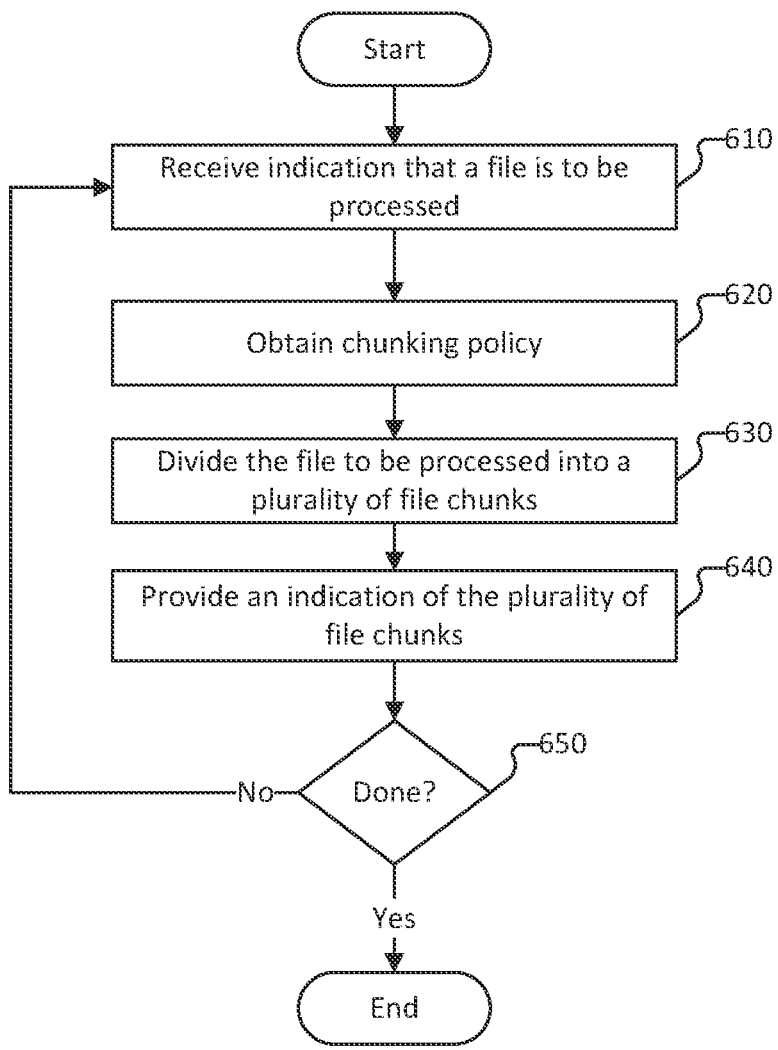
FIG. 6 is a flow diagram of a method for obtaining file chunks corresponding to a file according to various embodiments of the present application.

FIG. 6 is a flow diagram of a method for obtaining file chunks corresponding to a file according to various embodiments of the present application. In some embodiments, process 600 is implemented by system 100 of FIG. 1 and/or system 200 of FIG. 2. In some embodiments, process 600 is invoked by process 500 of FIG. 5, such as at 510.

At 610, an indication that a file is to be processed is received. In some embodiments, 610 corresponds to, or is similar to, 510 of process 500 of FIG. 5.

At 620, a chunking policy is obtained. The chunking policy can be predefined by an administrator or can be empirically determined using historical information associated with previous files that were processed using the set of processing engines. In various embodiments, the chunking policy for the file comprises a minimum chunk size, a maximum chunk size, a target chunk size, a minimum chunk number, a maximum chunk number, a target chunk number, a memory occupation minimum, a memory occupation maximum, a memory occupation target, or any other appropriate chunk criterion.

At 630, the file to be processed is divided into a plurality of file chunks. The system determines whether to divide the file into file chunks based at least in part on the chunking policy. In response to determining to segment the file to obtain a set of file chunks, the system obtains a plurality of file chunks.

At 640, an indication of the plurality of file chunks is provided. In some embodiments, the system provides the indication of the plurality of file chunks to a system or service that is to process the file chunks. For example, in the case that process was invoked by process 500 of FIG. 5, the system can provide the indication of the plurality of file chunks to such system or service implementing process 500.

At 650, a determination is made as to whether process 600 is complete. In some embodiments, process 600 is determined to be complete in response to a determination that no further files are to be processed, a chunking of the file has completed, a user has exited the system, an administrator indicates that process 600 is to be paused or stopped, etc. In response to a determination that process 600 is complete, process 600 ends. In response to a determination that process 600 is not complete, process 600 returns to 610.

Figure 7:
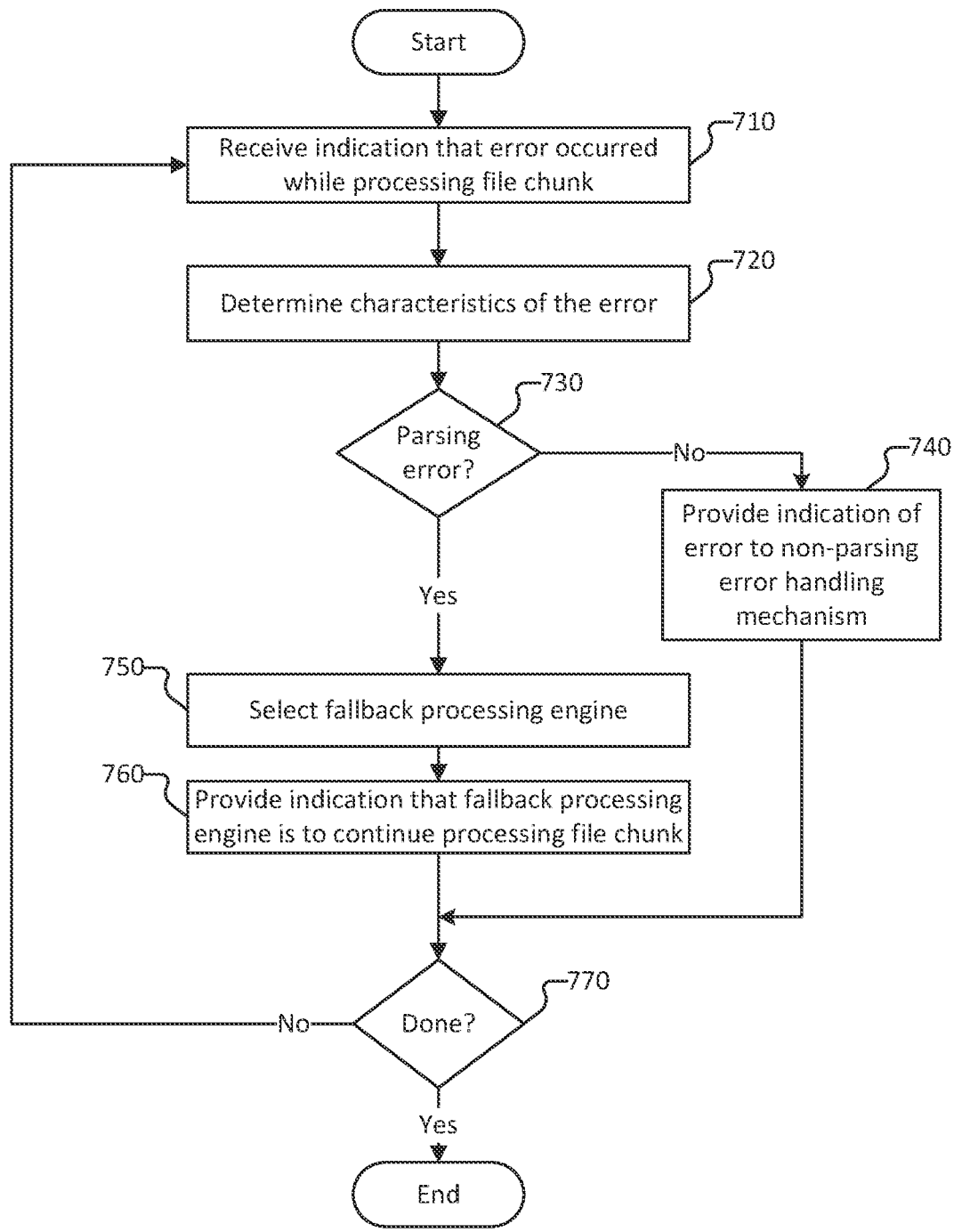
FIG. 7 is a flow diagram of a method for determining a fallback processing engine according to various embodiments of the present application.

FIG. 7 is a flow diagram of a method for determining a fallback processing engine according to various embodiments of the present application. In some embodiments, process 700 is implemented by system 100 of FIG. 1 and/or system 200 of FIG. 2. In some embodiments, process 700 is invoked by process 500 of FIG. 5, such as at 550.

At 710, an indication that an error occurred while processing a file chunk is received. In some embodiments, the system obtains the indication that the error occurred in response to the system (or other system or service) detecting the error. For example, in the case that process 700 is invoked in connection with process 500 of FIG. 5 by the system or service implementing process 500, the indication that the error occurred is provided in response to the determination at 550 of process 500.

At 720, one or more characteristics of the error is determined. In some embodiments, the system determines the one or more characteristics of the error based on an error code generated in connection with occurrence of the error. In some embodiments, the system obtains the one or more characteristics of the error based at least in part on querying an error log, such as in response to receiving the indication that the error occurred while processing the file chunk. The one or more characteristics of the error can include an error code, an indication of whether the error is a parsing error or a non-parsing error, a location in the file chunk at which the error occurred, etc.

At 730, a determination is made as to whether the error is a parsing error. The system uses the one or more characteristics to determine whether the error is a parsing error.

In response to a determination that the error is not a parsing error at 730, process 700 proceeds to 740 at which an indication of the error is provided to a non-parsing error handling mechanism. In some embodiments, the error is handled by the non-parsing error handling mechanism.

In response to a determination that the error is a parsing error at 730, process 700 proceeds to 750 at which a fallback processing engine is selected.

In some embodiments, the system determines to invoke a fallback processing engine (e.g., an alternative processing engine from a set of processing engines) in response to determining that a parsing error occurred. For example, based on the type of error or error code associated with the error, the system determines whether the current processing engine is optimized (or equipped) to handle the particular error. In response to determining that the current processing engine is optimized (or equipped) to handle the particular error, the system can determine to use the current processing engine to resume/continue processing the file/file chunk and/or to cause the current processing engine to continue such processing. Conversely, in response to determining that the current processing engine is not optimized (or equipped) to handle the particular error, the system can determine to invoke a fallback processing engine with which processing of the file/file chunk is to be continued. The system can further cause the fallback processing engine to continue processing the file/file chunk.

In response to detecting that an error occurred (e.g., a parsing error) and determining to invoke a fallback processing engine, the system determines the fallback processing engine to which processing of the file/file chunk is to fall back to. For example, the fallback processing engine can be selected from a set of one or more fallback processing engines. As another example, the system has a single fallback processing engine to which processing can fall back to. In the case of the system comprising a plurality of fallback processing engines, the system selects a particular fallback processing engine from among the plurality of fallback processing engines.

In some embodiments, the system selects the particular fallback processing engine to which to fall back to based on a type of error that occurred. For example, the particular fallback processing engine is selected based on a capability or characteristics of the processing engine. As another example, the system determines the type of parsing error and determines a particular fallback processing engine among the plurality of processing engines that is optimized for handling the error or the type of file (e.g., file format, syntax, etc.). As another example, the processing engine optimized for handling the error or the type of file can correspond to a processing engine for which an expected likelihood that such processing engine is to successfully complete processing the file/file chunk is the highest among the plurality of processing engines. As another example, the processing engine optimized for handling the error or the type of file can correspond to a preset definition of processing engines to handle certain errors or types of files. The particular fallback processing engine to which processing of the file/file chunk is to fall back to can be selected based on a determination that the particular processing engine is not expected to succumb to the same error. As an example, the particular processing engine is selected based on a determination that the particular processing engine is not expected to succumb to the same error or another parsing error.

In some embodiments, the system selects the particular fallback processing engine to which to fall back to based at least in part on a predefined order of processing engines. The system can store a single predefined order of processing engines, or a plurality of predefined orders of processing engines. For example, the system can store a plurality of predefined orders of processing engine for a plurality of different types of files (e.g., various file formats, syntax, etc.). In response to determining that processing of the file/file chunk is to fall back to another processing engine, the system obtains the applicable predefined order of processing engines and determines the particular fallback processing engine according to the predefined order. For example, the system determines the particular fallback processing engine to be a next processing engine in the predefined order.

In some embodiments, the system selects the particular fallback processing engine to which to fall back to based at least in part on (i) a predefined order of processing engines, and (ii) a type of error that occurred. In response to determining that processing of the file/file chunk is to fall back to a fallback processing engine, the system obtains the applicable predefined order and determines the fallback engine to which processing is to fall back to based on a first processing engine that is not expected to succumb to the same error (e.g., the particular type of parsing error that occurred). For example, in response to obtaining the predefined order, the system determines a next processing engine in the predefined order and determines whether the next processing engine is expected to succumb to the same error when processing the file/file chunk. In response to determining that the next processing engine is expected to succumb to the same error, the system determines to skip next processing engine. In connection with skipping the next processing engine, the system determines a subsequent processing engine and then in turn determines whether such subsequent processing engine is expected to succumb to the same error. The system can sequentially determine next processing engines according to the predefined order until the system identifies a processing engine that is not expected to succumb to the same problem.

At 760, an indication is provided that the fallback processing engine is to continue processing the file chunk. In some embodiments, in response to selecting the fallback processing engine to which processing of the file chunk is to fall back to, the system instructs the fallback processing engine to continue processing the file chunk, such as from a location in the file chunk at which the file chunk was last successfully processed. The system can provide to the fallback processing engine (or the compute resource implementing the fallback processing engine) an indication of the file chunk to be processed, the location in file chunk at which processing is to be continued, etc. As another example, the system can provide to the fallback processing engine an indication of a memory space, or location in the memory space, at which information parsed from the file chunk is to be stored.

As an example, in the case that process was invoked by process 500 of FIG. 5, the system can provide, to such system or service implementing process 500, the indication that the fallback processing engine is to continue processing the file chunk.

At 770, a determination is made as to whether process 700 is complete. In some embodiments, process 700 is determined to be complete in response to a determination that no further file chunks are to be processed, a fallback engine has been selected, processing of the file chunk has completed by the fallback engine(s), a user has exited the system, an administrator indicates that process 700 is to be paused or stopped, etc. In response to a determination that process 700 is complete, process 700 ends. In response to a determination that process 700 is not complete, process 700 returns to 710.

In some embodiments, the process of FIG. 7 is used with a type of error and a non-type of error that is not a parsing error (e.g., a syntax error, a time-out error, etc.).

Figure 8:
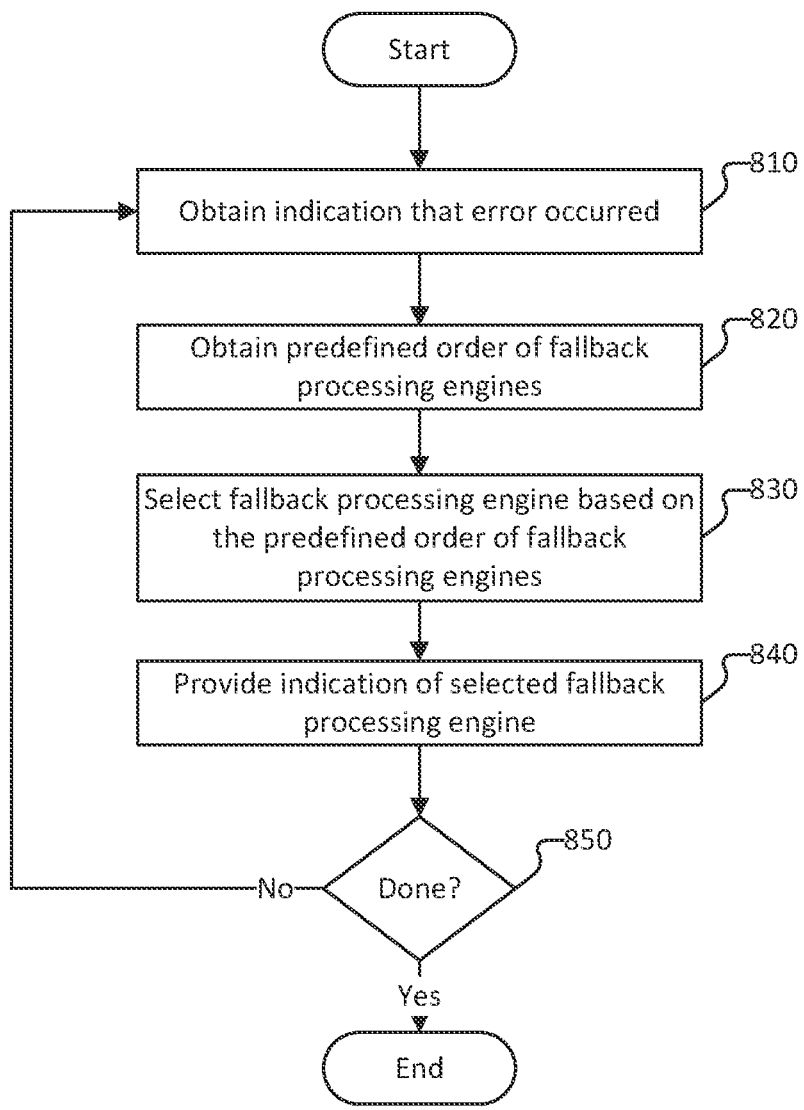
FIG. 8 is a flow diagram of a method for determining a fallback processing engine according to various embodiments of the present application.

FIG. 8 is a flow diagram of a method for determining a fallback processing engine according to various embodiments of the present application. In some embodiments, process 800 is implemented by system 100 of FIG. 1 and/or system 200 of FIG. 2. In some embodiments, process 800 is invoked by process 500 of FIG. 5, such as at, or in response to, 550.

At 810, an indication that an error occurred is obtained. In some embodiments, 810 corresponds to, or is similar to, 710 of process 700 of FIG. 7.

At 820, a predefined order of fallback processing engines is obtained.

At 830, a fallback processing engine is selected based at least in part on the predefined order of fallback processing engines. In some embodiments, the system selects the particular fallback processing engine to which to fall back to based at least in part on a predefined order of processing engines. The system can store a single predefined order of processing engines, or a plurality of predefined orders of processing engines. For example, the system can store a plurality of predefined orders of processing engine for a plurality of different types of files (e.g., various file formats, syntax, etc.). In response to determining that processing of the file/file chunk is to fall back to another processing engine, the system obtains the applicable predefined order of processing engines and determines the particular fallback processing engine according to the predefined order. For example, the system determines the particular fallback processing engine to be a next processing engine in the predefined order.

In some embodiments, the system selects the particular fallback processing engine to which to fall back to based at least in part on (i) a predefined order of processing engines, and (ii) a type of error that occurred. In response to determining that processing of the file/file chunk is to fall back to a fallback processing engine, the system obtains the applicable predefined order and determines the fallback engine to which processing is to fall back to based on a first processing engine that is not expected to succumb to the same error (e.g., the particular type of parsing error that occurred). For example, in response to obtaining the predefined order, the system determines a next processing engine in the predefined order and determines whether the next processing engine is expected to succumb to the same error when processing the file/file chunk. In response to determining that the next processing engine is expected to succumb to the same error, the system determines to skip the next processing engine. In connection with skipping the next processing engine, the system determines a subsequent processing engine and then in turn determines whether such subsequent processing engine is expected to succumb to the same error. The system can sequentially determine next processing engines according to the predefined order until the system identifies a processing engine that is not expected to succumb to the same problem.

At 840, an indication of the selected fallback processing engine is provided. In some embodiments, in response to selecting the fallback processing engine to which processing of the file chunk is to fall back to, the system instructs the fallback processing engine to continue processing the file chunk, such as from a location in the file chunk at which the file chunk was last successfully processed. The system can provide to the fallback processing engine (or the compute resource implementing the fallback processing engine) an indication of the file chunk to be processed, the location in file chunk at which processing is to be continued, etc. As another example, the system can provide to the fallback processing engine an indication of a memory space, or location in the memory space, at which information parsed from the file chunk is to be stored.

As an example, in the case that process was invoked by process 500 of FIG. 5, the system can provide, to such system or service implementing process 500, the indication that the fallback processing engine is to continue processing the file chunk.

At 850, a determination is made as to whether process 800 is complete. In some embodiments, process 800 is determined to be complete in response to a determination that no further file chunks are to be processed, a fallback engine has been selected, processing of the file chunk has completed by the fallback engine(s), a user has exited the system, an administrator indicates that process 800 is to be paused or stopped, etc. In response to a determination that process 800 is complete, process 800 ends. In response to a determination that process 800 is not complete, process 800 returns to 810.

Figure 9:
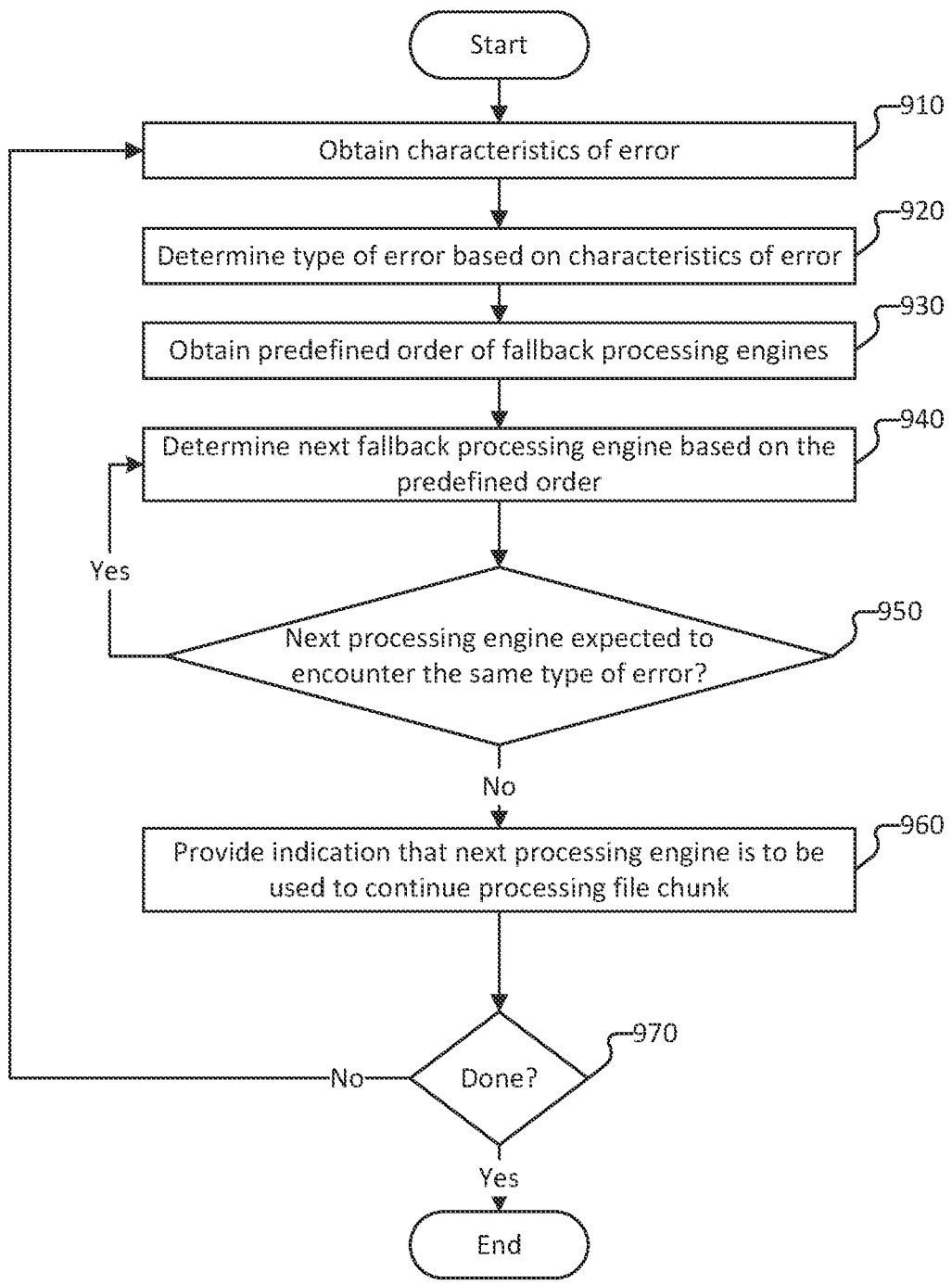
FIG. 9 is a flow diagram of a method for determining a fallback processing engine according to various embodiments of the present application.

FIG. 9 is a flow diagram of a method for determining a fallback processing engine according to various embodiments of the present application. In some embodiments, process 900 is implemented by system 100 of FIG. 1 and/or system 200 of FIG. 2. In some embodiments, process 900 is invoked by process 500 of FIG. 5, such as at, or in response to, 550.

At 910, one or more characteristics of an error are obtained. In some embodiments, the system determines the one or more characteristics of the error based on an error code generated in connection with occurrence of the error. In some embodiments, the system obtains the one or more characteristics of the error based at least in part on querying an error log, such as in response to receiving the indication that the error occurred while processing the file chunk. The one or more characteristics of the error can include an error code, an indication of whether the error is a parsing error or a non-parsing error, a location in the file chunk at which the error occurred, etc.

At 920, a type of error is determined based at least in part on the one or more characteristics of the error. In some embodiments, the system determines the type of error based on an error code stored in the error log in association with the error.

At 930, a predefined order of fallback processing engines is obtained. In some embodiments, 930 corresponds to, or is similar to, 820 of process 800 of FIG. 8.

At 940, a next fallback processing engine is determined based at least in part on the predefined order. In some embodiments, the system uses the predefined order to determine the processing engine that is immediately subsequent to the processing engine that was processing the file/file chunk when the error occurred, or in subsequent iterations of 940 (via the iterating over 940-950), the processing engine immediately subsequent to the next processing engine identified in the previous iteration of 940.

At 950, a determination is made as to whether the next processing engine is expected to succumb to the same type of error.

In response to a determination that the next processing engine is expected to succumb to the same type of error at 950, process 900 returns to 940 at which a subsequent next processing engine is determined based on the predefined order. Process 900 can iterate over 940-950 until a next processing engine that is not expected to succumb to the same type of error is identified.

In response to a determination that the next processing engine is not expected to succumb to the same type of error at 950, process 900 proceeds to 960 at which an indication that the next processing engine is to be used to continue processing the file chunk is provided.

At 970, a determination is made as to whether process 900 is complete. In some embodiments, process 800 is determined to be complete in response to a determination that no further file chunks are to be processed, a fallback engine has been selected, processing of the file chunk has completed by the fallback engine(s), a user has exited the system, an administrator indicates that process 900 is to be paused or stopped, etc. In response to a determination that process 900 is complete, process 900 ends. In response to a determination that process 900 is not complete, process 900 returns to 910.

Figure 10:
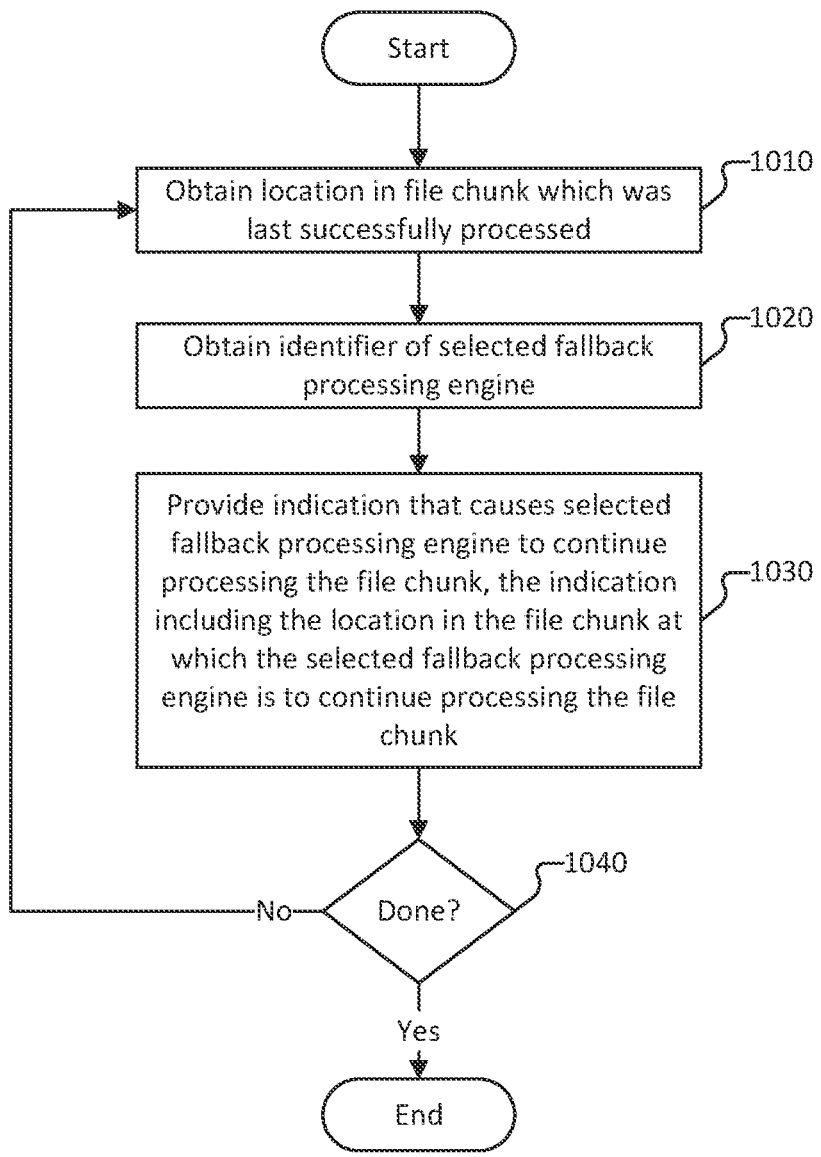
FIG. 10 is a flow diagram of a method for causing processing of the file chunk to be continued by a falling processing engine according to various embodiments of the present application.

FIG. 10 is a flow diagram of a method for causing processing of the file chunk to be continued by a falling processing engine according to various embodiments of the present application. In some embodiments, process 1000 is implemented by system 100 of FIG. 1 and/or system 200 of FIG. 2.

At 1010, a location in the file chunk which was last successfully processed is obtained. In some embodiments, the system logs locations in the file that were successfully processed as the processing engine progresses through the file.

At 1020, an identifier of the selected fallback processing engine is obtained. In some embodiments, the fallback processing engine is selected based on invoking, or in connection with process 700 of FIG. 7, process 800 of FIG. 8, and/or process 900 of FIG. 9.

At 1030, an indication is provided that causes the selected fallback processing engine to continue processing the file chunk. In some embodiments, the indication includes the location in the file chunk at which the selected fallback processing is to continue processing the file chunk. As an example, 1030 corresponds to, or is similar to, 560 of process 500 and/or 760 of process 700.

At 1040, a determination is made as to whether process 1000 is complete. In some embodiments, process 1000 is determined to be complete in response to a determination that no further file chunks are to be processed, processing of the file chunk has completed by the fallback engine(s), a user has exited the system, an administrator indicates that process 1000 is to be paused or stopped, etc. In response to a determination that process 1000 is complete, process 1000 ends. In response to a determination that process 1000 is not complete, process 1000 returns to 1010.

Figure 11:
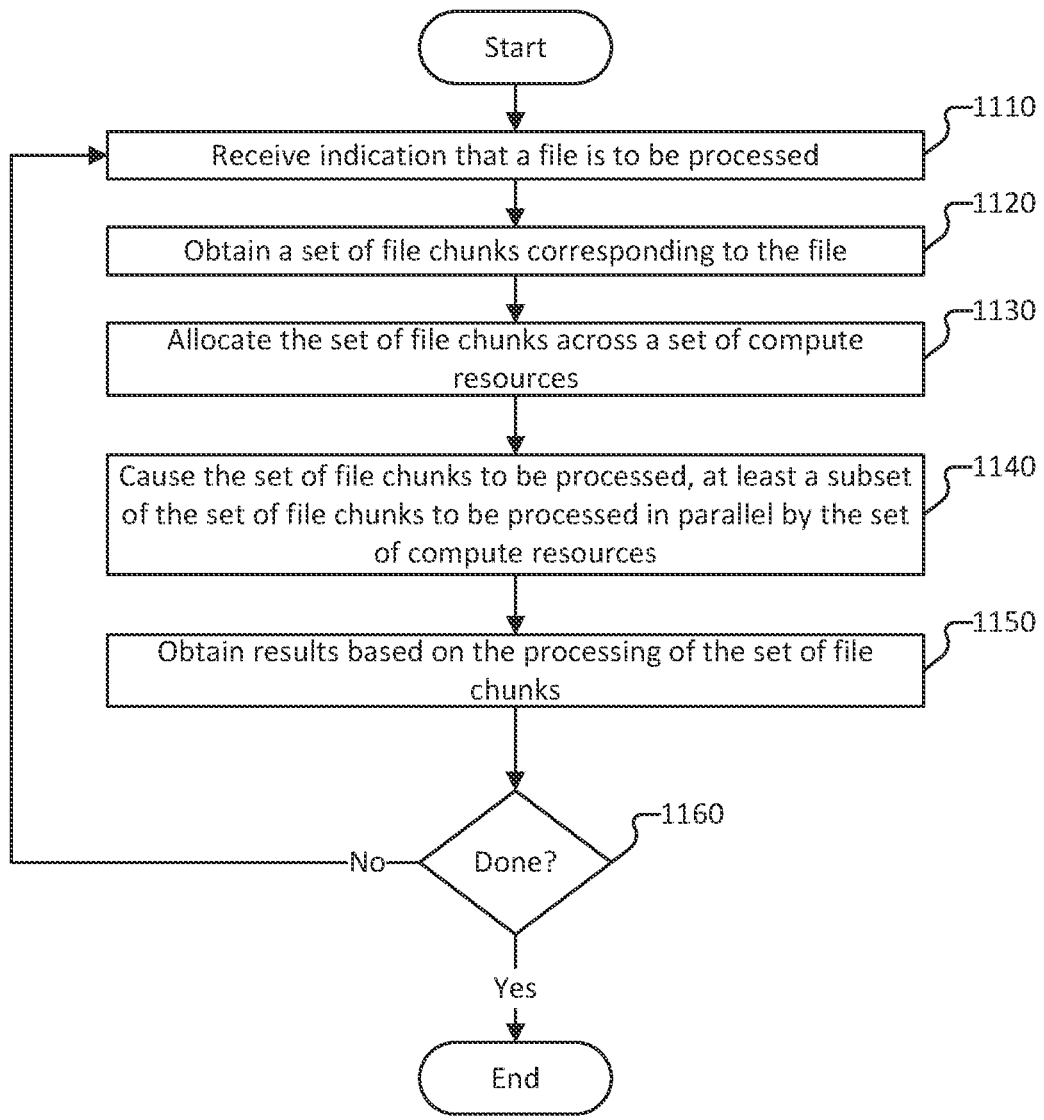
FIG. 11 is a flow diagram of a method for processing a plurality of file chunks by compute resources according to various embodiments of the present application.

FIG. 11 is a flow diagram of a method for processing a plurality of file chunks by compute resources according to various embodiments of the present application. In some embodiments, process 1100 is implemented by system 100 of FIG. 1 and/or system 200 of FIG. 2.

At 1110, an indication that a file is to be processed is received. In some embodiments, 1110 corresponds to, or is similar to, 510 of process 500.

At 1120, a set of file chunks corresponding to the file is obtained. In some embodiments, the set of file chunks corresponding to the file is obtained based at least in part on invoking a chunking of the file. For example, the system can invoke process 600 to obtain the set of file chunks.

At 1130, the set of file chunks is allocated across a set of compute resources. In some embodiments, the system determines that at least a subset of the set of file chunks are to be processed in parallel. In response to determining that the subset of the set of file chunks are to be processed in parallel, the system allocates each of file chunks in the subset to a corresponding compute resource allocatable for processing the file.

At 1140, the set of file chunks is caused to be processed. In some embodiments, at least a subset of the set of file chunks is to be processed in parallel by the set of compute resources. In some embodiments, each of the file chunks are processed based on invoking (e.g., by the compute resource allocated to such file chunk) process 500 for each such file chunk.

At 1150, results based on the processing of the set of file chunks is obtained. In some embodiments, the system stores the results obtained based on the processing of the set of file chunks by the respective compute resources. In some embodiments, the system combines the results to obtain an aggregated file processing result. The aggregated file processing result can be stored in a dataset.

At 1160, a determination is made as to whether process 1100 is complete. In some embodiments, process 1100 is determined to be complete in response to a determination that no further files are to be processed, processing of a set of file chunks for a file has completed, a user has exited the system, an administrator indicates that process 1100 is to be paused or stopped, etc. In response to a determination that process 1100 is complete, process 1100 ends. In response to a determination that process 1100 is not complete, process 1100 returns to 1110.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method, comprising:
   receiving an indication that a file from a data source be processed;
   accessing one or more compute resources, a compute resource configured with one of more processing engines;
   selecting a first processing engine from the one or more compute resources for processing a file chunk of the file, the file chunk at least a part of the file;
   parsing the file chunk using the first processing engine to extract information from the file chunk;
   detecting occurrence of an error responsive to parsing at least a part of the file chunk on the first processing engine;
   determining to invoke an alternative processing engine other than the first processing engine responsive to the error occurrence;
   selecting a second processing engine from the one or more compute resources for processing a remaining part of the file chunk including the part of the file chunk at which the error was detected; and
   parsing at least the remaining part of the file chunk using the second processing engine.

2. The method of claim 1, wherein the error is a parsing error, and determining the invocation of an alternative processing engine is responsive to the error occurrence of the parsing error by the first processing engine.

3. The method of claim 2, the parsing error comprising at least one or a combination of missing commas, bad numbers, single quotations, missing quotations, unescaped special characters.

4. The method of claim 1, further comprising:
   writing, by the first processing engine, the extracted information from parsing the file chunk to a memory space and logging a location of the memory space;
   writing, by the second processing engine, extracted information from parsing the remaining part of the file chunk beginning from the location of the memory space.

5. The method of claim 1, further comprising combining results from parsing the file chunk by the first processing engine and results from parsing the file chunk by the second processing engine to obtain an aggregated file.

6. The method of claim 1, wherein selecting the first processing engine further comprises selecting the first processing engine based on a type of the file.

7. The method of claim 1, further comprising responsive to determining that the second processing engine has parsed the part of the file chunk at which the error was detected, reverting parsing of the file chunk to the first processing engine.

8. A non-transitory computer-readable storage medium comprising stored instructions executable by a processor, the instructions when executed causing the processor to:
   receive an indication that a file from a data source be processed;
   access one or more compute resources, a compute resource configured with one of more processing engines;
   select a first processing engine from the one or more compute resources for processing a file chunk of the file, the file chunk at least a part of the file;
   parse the file chunk using the first processing engine to extract information from the file chunk;
   detect occurrence of an error responsive to parsing at least a part of the file chunk on the first processing engine;
   determine to invoke an alternative processing engine other than the first processing engine responsive to the error occurrence;
   select a second processing engine from the one or more compute resources for processing a remaining part of the file chunk including the part of the file chunk at which the error was detected; and
   parse at least the remaining part of the file chunk using the second processing engine.

9. The non-transitory computer-readable storage medium of claim 8, wherein the error is a parsing error, and the instructions when executed causing the processor to determine the invocation of an alternative processing engine responsive to the error occurrence of the parsing error by the first processing engine.

10. The non-transitory computer-readable storage medium of claim 8, the parsing error comprising at least one or a combination of missing commas, bad numbers, single quotations, missing quotations, unescaped special characters.

11. The non-transitory computer-readable storage medium of claim 8, further comprising instructions when executed causing the processor to:
    write, by the first processing engine, the extracted information from parsing the file chunk to a memory space and logging a location of the memory space;
    write, by the second processing engine, extracted information from parsing the remaining part of the file chunk beginning from the location of the memory space.

12. The non-transitory computer-readable storage medium of claim 8, further comprising instructions when executed causing the processor to combine results from parsing the file chunk by the first processing engine and results from parsing the file chunk by the second processing engine to obtain an aggregated file.

13. The non-transitory computer-readable storage medium of claim 8, wherein instructions when executed causing the processor to select the first processing engine based on a type of the file.

14. The non-transitory computer-readable storage medium of claim 8, further comprising instructions when executed causing the processor to determine that the second processing engine has parsed the part of the file chunk at which the error was detected, and revert parsing of the file chunk to the first processing engine.

15. A computer system, comprising:
a computer processor; and
a memory comprising stored instructions that when executed by the computer processor causes the computer system to:
receive an indication that a file from a data source be processed;
access one or more compute resources, a compute resource configured with one of more processing engines;
select a first processing engine from the one or more compute resources for processing a file chunk of the file, the file chunk at least a part of the file;
parse the file chunk using the first processing engine to extract information from the file chunk;
detect occurrence of an error responsive to parsing at least a part of the file chunk on the first processing engine;
determine to invoke an alternative processing engine other than the first processing engine responsive to the error occurrence;
select a second processing engine from the one or more compute resources for processing a remaining part of the file chunk including the part of the file chunk at which the error was detected; and
parse at least the remaining part of the file chunk using the second processing engine.

16. The computer system of claim 15, wherein the error is a parsing error, and the instructions when executed causing the computer system to determine the invocation of an alternative processing engine responsive to the error occurrence of the parsing error by the first processing engine.

17. The computer system of claim 16, the parsing error comprising at least one or a combination of missing commas, bad numbers, single quotations, missing quotations, unescaped special characters.

18. The computer system of claim 15, further comprising instructions when executed causing the computer system to:
write, by the first processing engine, the extracted information from parsing the file chunk to a memory space and logging a location of the memory space;
write, by the second processing engine, extracted information from parsing the remaining part of the file chunk beginning from the location of the memory space.

19. The computer system of claim 15, further comprising instructions when executed causing the computer system to combine results from parsing the file chunk by the first processing engine and results from parsing the file chunk by the second processing engine to obtain an aggregated file.

20. The computer system of claim 15, further comprising instructions when executed causing the computer system to determine that the second processing engine has parsed the part of the file chunk at which the error was detected, and revert parsing of the file chunk to the first processing engine.

* * * * *